United States Patent
Hayashi

(10) Patent No.: US 10,730,473 B2
(45) Date of Patent: Aug. 4, 2020

(54) FRONT SEAT AIRBAG DEVICE, METHOD FOR CONTROLLING FRONT SEAT AIRBAG DEVICE, AND METHOD FOR FOLDING AIRBAG

(71) Applicant: TOYOTA JIDOSHA KABUSHIKI KAISHA, Toyota-shi, Aichi-ken (JP)

(72) Inventor: Shigeki Hayashi, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 16/008,700

(22) Filed: Jun. 14, 2018

(65) Prior Publication Data
US 2019/0016294 A1    Jan. 17, 2019

(30) Foreign Application Priority Data
Jul. 11, 2017    (JP) .................. 2017-135740

(51) Int. Cl.
| | |
|---|---|
| *B60R 21/237* | (2006.01) |
| *B60R 21/015* | (2006.01) |
| *B60R 21/2338* | (2011.01) |
| *B60R 21/239* | (2006.01) |
| *B60R 21/233* | (2006.01) |
| *B60R 21/00* | (2006.01) |

(52) U.S. Cl.
CPC ...... *B60R 21/237* (2013.01); *B60R 21/01554* (2014.10); *B60R 21/233* (2013.01); *B60R 21/239* (2013.01); *B60R 21/2338* (2013.01); *B60R 2021/0004* (2013.01); *B60R 2021/23308* (2013.01); *B60R 2021/23324* (2013.01); *B60R 2021/23386* (2013.01)

(58) Field of Classification Search
CPC ............ B60R 21/237; B60R 21/01554; B60R 21/2338; B60R 21/239; B60R 21/233; B60R 2021/23324; B60R 2021/0004; B60R 2021/23308; B60R 2021/23386; B60R 21/20; B60R 21/231; B60N 2/28
See application file for complete search history.

(56) References Cited

U.S. PATENT DOCUMENTS

| | | | |
|---|---|---|---|
| 5,454,591 A | 10/1995 | Mazur et al. | |
| 6,913,238 B2 * | 7/2005 | Bakker | A47B 21/0314 248/460 |
| 9,308,883 B1 * | 4/2016 | Schneider | B60R 21/231 |
| 2006/0082114 A1 * | 4/2006 | Heym | B60R 21/233 280/743.1 |

(Continued)

FOREIGN PATENT DOCUMENTS

| | | |
|---|---|---|
| EP | 1 686 017 A1 | 8/2006 |
| EP | 1 951 560 A1 | 8/2008 |

(Continued)

*Primary Examiner* — Darlene P Condra
(74) *Attorney, Agent, or Firm* — Oliff PLC

(57) ABSTRACT

A front seat airbag device includes an inflator configured to operate and generate gas when a frontal collision of a vehicle is detected or predicted and an airbag configured to include a main chamber stored in front of a front seat in the vehicle, inflation-deployed by the gas being supplied from the inflator, and inflation-deployed to a position facing the front seat and a parietal chamber inflation-deployed upward and rearward from an upper end portion of the main chamber.

4 Claims, 18 Drawing Sheets

(56) References Cited

U.S. PATENT DOCUMENTS

| | | | |
|---|---|---|---|
| 2006/0249943 A1* | 11/2006 | Bauer | B60R 21/231 |
| | | | 280/743.2 |
| 2007/0257473 A1* | 11/2007 | Choi | B60R 21/0136 |
| | | | 280/735 |
| 2009/0189376 A1* | 7/2009 | Vigeant | B60R 21/233 |
| | | | 280/742 |
| 2011/0101660 A1* | 5/2011 | Schneider | B60R 21/206 |
| | | | 280/731 |
| 2013/0001935 A1 | 1/2013 | Nagasawa et al. | |
| 2014/0265278 A1* | 9/2014 | Anderson | B60R 21/233 |
| | | | 280/743.1 |
| 2015/0151709 A1* | 6/2015 | Anderson | B60R 21/239 |
| | | | 280/729 |
| 2015/0217716 A1* | 8/2015 | Anderson | B60R 21/2338 |
| | | | 280/729 |
| 2018/0229681 A1* | 8/2018 | Jaradi | B60R 21/264 |
| 2018/0319358 A1* | 11/2018 | Schneider | B60R 21/233 |

FOREIGN PATENT DOCUMENTS

| | | |
|---|---|---|
| JP | H08-058522 A | 3/1996 |
| JP | H11-170961 A | 6/1999 |
| JP | 2007-216830 A | 8/2007 |
| WO | 2007/060515 A1 | 5/2007 |

* cited by examiner

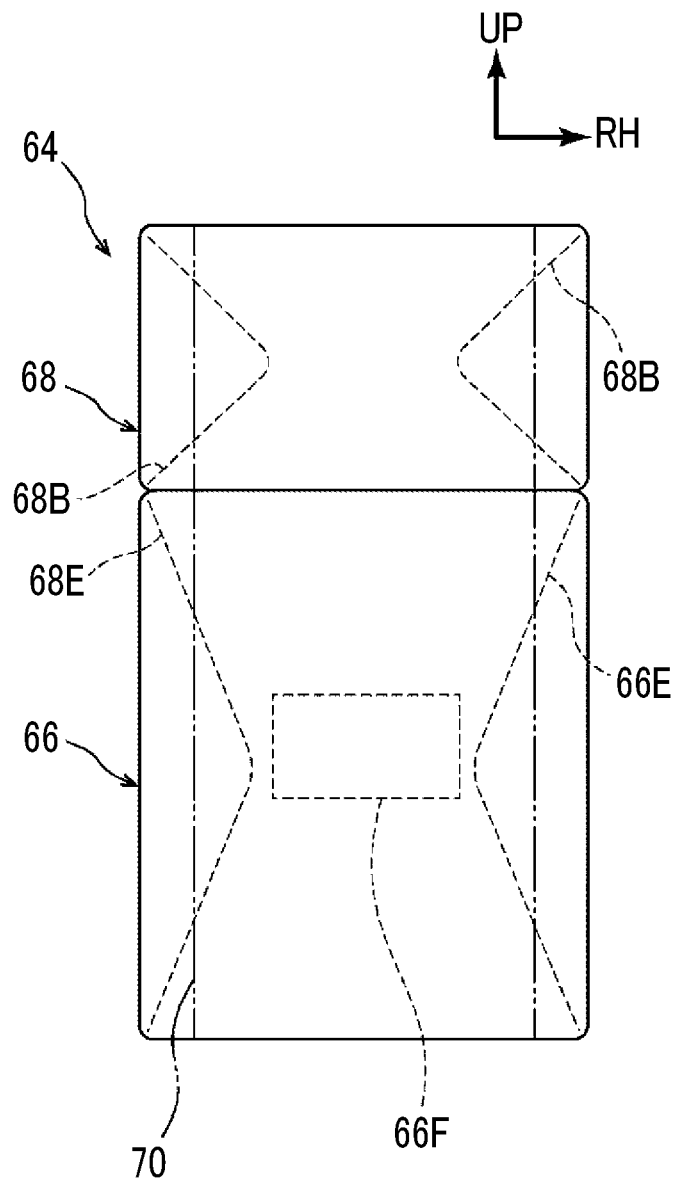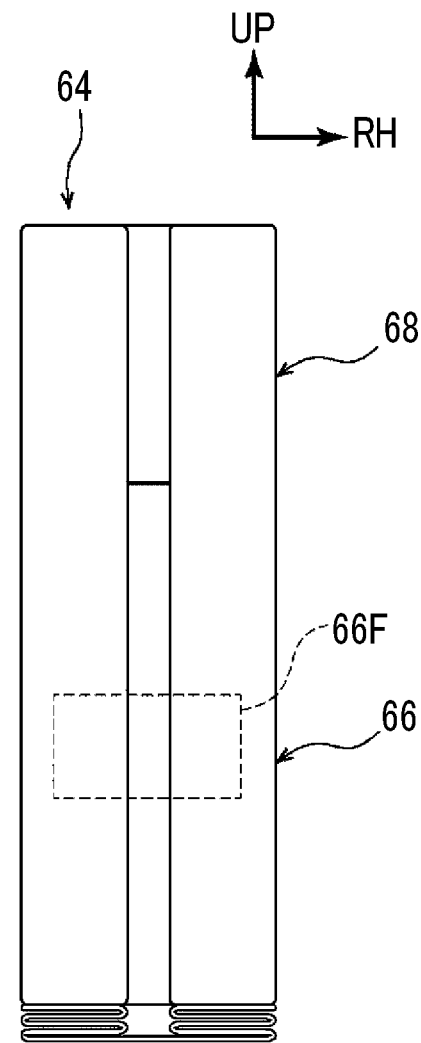
FIG. 15A
FIG. 15B

FRONT SEAT AIRBAG DEVICE, METHOD FOR CONTROLLING FRONT SEAT AIRBAG DEVICE, AND METHOD FOR FOLDING AIRBAG

INCORPORATION BY REFERENCE

The disclosure of Japanese Patent Application No. 2017-135740 filed on Jul. 11, 2017 including the specification, drawings and abstract is incorporated herein by reference in its entirety.

BACKGROUND

1. Technical Field

The disclosure relates to a front seat airbag device, a method for controlling a front seat airbag device, and a method for folding an airbag.

2. Description of Related Art

Japanese Unexamined Patent Application Publication No. 2007-216830 (JP 2007-216830 A) discloses an airbag deployment device controlling airbag deployment at the time of a frontal collision of a vehicle in accordance with the attachment direction of a child seat (child restraint system: CRS) attached to a passenger seat. Specifically, the control is performed such that an airbag is deployed in a case where the child seat is attached forward and airbag deployment is prohibited in a case where the child seat is attached rearward. A similar device is disclosed in Japanese Unexamined Patent Application Publication No. 8-058522 (JP 8-058522 A).

SUMMARY

An occupant in a driver's seat or an occupant in a passenger seat changing the direction of the seat during traveling is assumed with the development of autonomous driving technology and driving support technology. Desirable even in such cases is a front seat airbag that is capable of maintaining occupant restraining performance at the time of a frontal collision of a vehicle.

The disclosure provides a front seat airbag device, a method for controlling a front seat airbag device, and a method for folding an airbag allowing head restraining performance for an occupant to be maintained during a frontal collision of a vehicle regardless of whether a front seat faces forward or rearward.

A first aspect of the disclosure relates to a front seat airbag device. The front seat airbag device includes an inflator and an airbag. The inflator is configured to generate gas when a frontal collision of a vehicle is detected or predicted. The airbag is configured to include a main chamber stored in front of a front seat in the vehicle, and to inflate and deploy to a position facing the front seat by the gas being supplied from the inflator, and a parietal chamber is configured to inflate and deploy upward and rearward from an upper end portion of the main chamber.

In the front seat airbag device according to the first aspect of the disclosure, the airbag is stored in front of the front seat in the vehicle and the inflator is operated and the gas is supplied into the airbag once the frontal collision of the vehicle is detected or predicted. The airbag is configured to include the main chamber and the parietal chamber. The main chamber inflates and deploys at the position facing the front seat. As a result, when the frontal collision occurs in a state where the front seat faces forward, the head of an occupant inertially moved to the front of the vehicle can be restrained by the main chamber.

The parietal chamber inflates and deploys upward and rearward from the upper end portion of the main chamber. In a state where the front seat faces rearward (is directed toward the rear seat side), for example, an occupant may be inertially moved diagonally upward along the seat back by the inertial force that is directed toward the vehicle front side at the time of the frontal collision of the vehicle. Even in this case, the occupant's head (parietal part in particular) can be restrained from above the occupant's head in the vehicle by the parietal chamber. The frontal collision includes a diagonal collision and a small overlap collision.

In the front seat airbag device according to the first aspect of the disclosure, the inflator may be connected to the main chamber, the front seat airbag device may further include a partition portion partitioning the parietal chamber and the main chamber from each other, and the partition portion may have a communication hole allowing the parietal chamber and the main chamber to communicate with each other.

In the front seat airbag device according to the first aspect of the disclosure, the inflator is connected to the main chamber, and thus the gas is supplied from the inflator to the main chamber in the early stage of a collision and the main chamber inflates and deploys early. As a result, the initial restraining force for the head of the occupant when the front seat faces forward can be improved. When the front seat faces rearward, falling of the seat back to the front of the vehicle can be effectively suppressed by the main chamber inflation-deployed early.

The parietal chamber is partitioned from the main chamber by the partition portion, and the parietal chamber and the main chamber communicate with each other via the communication hole formed in the partition portion. As a result, the parietal chamber is inflation-deployed after the main chamber is inflation-deployed, and thus the internal pressure of the parietal chamber can be maintained until a timing at which a rearward-seated occupant is inertially moved diagonally upward along the seat back.

In the front seat airbag device according to the first aspect of the disclosure, a plurality of the communication holes may be provided bilaterally symmetrical with respect to a vehicle width direction middle portion of the airbag.

In the front seat airbag device according to the first aspect of the disclosure, gas flows equally on the right and left from the main chamber to the parietal chamber. As a result, the deployment behavior of the parietal chamber can be stabilized.

The front seat airbag device according to the first aspect of the disclosure may further include a tension member connecting a lower portion of the main chamber and an upper portion of the parietal chamber. The length of the tension member may be set such that tension acts on the tension member in an inflation deployment state of the airbag.

In the front seat airbag device according to the first aspect of the disclosure, the upper portion of the parietal chamber is pulled to the main chamber side (downward) by the tension member in the inflation deployment state of the airbag. As a result, a restraining force applied to the parietal part of the occupant inertially moved upward can be improved.

In the front seat airbag device according to the first aspect of the disclosure, the tension member may be configured to include a wide tension cloth facing the front seat in the inflation deployment state of the airbag.

In the front seat airbag device according to the first aspect of the disclosure, the wide tension cloth faces the front seat in the inflation deployment state of the airbag. As a result, when the frontal collision occurs in a state where the front seat faces forward, the head of the occupant can be restrained by the wide tension cloth before the head of the occupant is restrained by the main chamber.

In the front seat airbag device according to the first aspect of the disclosure, a width of an upper end portion of the wide tension cloth may be longer than a width of a lower end portion of the wide tension cloth in an inflation deployment state of the wide tension cloth.

In the front seat airbag device according to the first aspect of the disclosure, the upper end portion of the wide tension cloth may be sewn and connected to an upper side of the parietal chamber and a lower end portion of the wide tension cloth may be sewn and connected to a lower side of the main chamber.

In the front seat airbag device according to the first aspect of the disclosure, the tension member may be configured to include a pair of right and left narrow tension cloths connecting vehicle width direction end portions of the main chamber and the parietal chamber to each other in the inflation deployment state of the airbag.

In the front seat airbag device according to the first aspect of the disclosure, both vehicle width direction end portions of the parietal chamber are pulled to the main chamber side (downward) by the narrow tension cloths in the inflation deployment state of the airbag. As a result, the parietal part of the occupant can be restrained in a satisfactory manner even in a case where the parietal part (head) of the occupant is inertially and diagonally moved during a frontal collision of the vehicle such as a diagonal collision and a small overlap collision.

In the front seat airbag device according to the first aspect of the disclosure, the parietal chamber may be provided with an expansion portion expanding in the vehicle width direction with respect to the main chamber in an inflation deployment state.

In the front seat airbag device according to the first aspect of the disclosure, the expansion portion is set in the parietal chamber and the expansion portion expands in the vehicle width direction with respect to the main chamber in the inflation deployment state of the airbag. As a result, the parietal part of the occupant can be restrained in a satisfactory manner even in a case where the parietal part of the occupant abuts with rightward or leftward shifting from the vehicle width direction middle portion of the parietal chamber.

In the front seat airbag device according to the first aspect of the disclosure, the parietal chamber may have a vent hole communicating with the outside.

In the front seat airbag device according to the first aspect of the disclosure, a higher-than-needed internal pressure of the parietal chamber can be suppressed by the vent hole and the internal pressure of the parietal chamber can be appropriately maintained.

A second aspect of the disclosure relates to a method for controlling the front seat airbag device according to the first aspect of the disclosure. The method includes controlling the amount of gas supply from the inflator to the airbag such that the internal pressure of the main chamber is higher in a case where the front seat faces rearward than in a case where the front seat faces forward when the frontal collision of the vehicle is detected or predicted.

In the method for controlling the front seat airbag device according to the second aspect of the disclosure, an amount of gas supply is controlled such that the internal pressure of the main chamber is higher in a case where the front seat faces rearward than in a case where the front seat faces forward. As a result, falling of the seat back to the vehicle front side during a frontal collision of the vehicle can be effectively suppressed. In a case where the front seat faces forward, the internal pressure of the main chamber is not higher than needed and the head can be restrained at a normal-range internal pressure at which the head of the occupant is restrained.

In the method for controlling the front seat airbag device according to the second aspect of the disclosure, the control may include generating the gas from a first gas generation unit and a second gas generation unit in the inflator in a case where the front seat faces rearward when the frontal collision of the vehicle is detected or predicted and generating the gas from one of the first gas generation unit and the second gas generation unit in the inflator in a case where the front seat faces forward when the frontal collision of the vehicle is detected or predicted.

A third aspect of the disclosure relates to a method for folding the airbag constituting the front seat airbag device according to the first aspect of the disclosure. The method includes folding each of a right and a left of the main chamber and the parietal chamber in a pre-folding state in a bellows shape, a polygonal line of the bellow shape extending in an up-down direction, folding each of a top and a bottom of the main chamber in a bellows shape such that the main chamber faces the front seat in an inflation deployment state of the airbag, a polygonal line of the bellow shape extending in a right-left direction after the folding of each of a right and a left of the main chamber and the parietal chamber; and disposing the parietal chamber on the main chamber after the parietal chamber is folded in a bellows shape, a polygonal line of the bellows shape extending in the right-left direction or folded in a roll shape from an upper end toward a lower end such that the parietal chamber faces the front seat in the inflation deployment state of the airbag after the folding of each of a top and a bottom of the main chamber.

In the method for folding the airbag according to the third aspect of the disclosure, folding is sequentially released from the part folded last during inflation deployment of the airbag, and thus the parietal chamber disposed on the main chamber in the disposing of the parietal chamber on the main chamber is deployed in advance. As a result, inflation deployment of the main chamber is completed without being hindered by the parietal chamber.

A fourth aspect relates to a method for folding the airbag constituting the front seat airbag device according to the first aspect of the disclosure. The method includes folding each of a right and a left of the main chamber and the parietal chamber in a pre-folding state in a bellows shape, a polygonal line of the bellow shape extending in an up-down direction, folding the main chamber in a roll shape from an upper end toward a lower end such that the main chamber faces the front seat in an inflation deployment state of the airbag and disposing the main chamber on the inflator after the folding of each of a right and a left of the main chamber and the parietal chamber, and folding the parietal chamber in a roll shape from an upper end toward a lower end such that the parietal chamber faces the front seat in the inflation deployment state of the airbag and disposing the parietal chamber on the main chamber folded in the roll shape after the folding of the main chamber.

In the method for folding the airbag according to the fourth aspect of the disclosure, folding is sequentially released from the part folded last during inflation deployment of the airbag, and thus the parietal chamber disposed on the main chamber in disposing of the main chamber is deployed in advance. As a result, inflation deployment of the main chamber is completed without being hindered by the parietal chamber.

As described above, with the front seat airbag device according to the first aspect of the disclosure, an excellent effect is achieved in that the head restraining performance for the occupant at the time of a frontal collision of the vehicle can be maintained regardless of whether the front seat faces forward or rearward.

In addition, with the front seat airbag device according to the first aspect of the disclosure, an excellent effect is achieved in that the initial restraining force for the occupant's head in a state where the front seat faces forward can be improved and the restraining force for the occupant in a state where the front seat faces rearward can be improved.

In addition, with the front seat airbag device according to the first aspect of the disclosure, an excellent effect is achieved in that the parietal chamber can be smoothly inflation-deployed.

In addition, with the front seat airbag device according to the first aspect of the disclosure, an excellent effect is achieved in that a restraining force for the occupant's parietal part in a state where the front seat faces rearward can be improved.

In addition, with the front seat airbag device according to the first aspect of the disclosure, an excellent effect is achieved in that the occupant's head can be restrained early in a state where the front seat faces forward.

In addition, with the front seat airbag device according to the first aspect of the disclosure, an excellent effect is achieved in that a restraining force for the occupant's parietal part can be improved at the time of a frontal collision such as a diagonal collision and a small overlap collision in a state where the front seat faces rearward.

In addition, with the front seat airbag device according to the first aspect of the disclosure, an excellent effect is achieved in that the range in which the parietal part is restrained can be widened in the vehicle width direction.

In addition, with the front seat airbag device according to the first aspect of the disclosure, an excellent effect is achieved in that the occupant's parietal part can be restrained with an appropriate restraining force.

By the method for controlling the front seat airbag device according to the second aspect of the disclosure, an excellent effect is achieved in that the head restraining performance for the occupant at the time of a frontal collision of the vehicle can be maintained regardless of whether the front seat faces forward or rearward.

By the method for folding the airbag according to the third and fourth aspects of the disclosure, an excellent effect is achieved in that the deployment behaviors of the main chamber and the parietal chamber can be stabilized.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 15A is a schematic diagram for showing a method for folding an airbag constituting the front seat airbag device according to the second embodiment, which shows a pre-folding state;

FIG. 15B is a schematic diagram for showing the method for folding the airbag constituting the front seat airbag device according to the second embodiment, which shows a state where a first step has been completed;

DETAILED DESCRIPTION OF EMBODIMENTS

First Embodiment

Hereinafter, a front seat airbag device 10 according to a first embodiment will be described with reference to accompanying drawings. The arrows FR, UP, and RH that are appropriately shown in each of the drawings represent the forward, upward, and rightward directions of a vehicle 100, respectively. Unless otherwise noted, the front and rear, the top and bottom, and the right and left that are mentioned in the following description represent the front and rear in the vehicle front-rear direction, the top and bottom in the vehicle up-down direction, and the right and left in the vehicle width direction in a state where the vehicle is in the traveling direction thereof, respectively. In FIGS. 6A, 6B, 15A, and 15B, which are explanatory diagrams showing airbag folding steps, the upward and rightward directions in a state where the airbag is inflation-deployed are indicated by the arrows UP and RH, respectively.

Configuration of Driver's Seat

Figure 1:
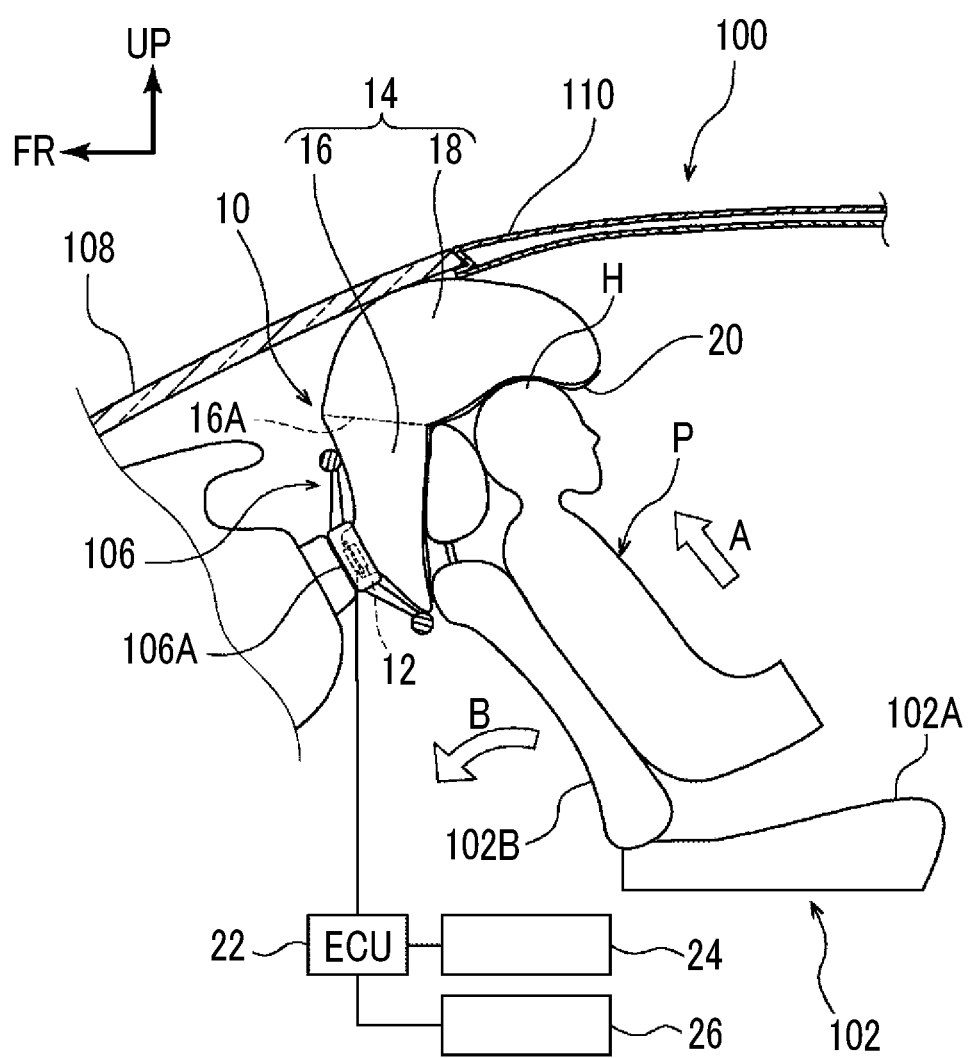
FIG. 1 is a side view schematically illustrating how protection is performed by a front seat airbag device according to a first embodiment, which is a side view in a case where a driver's seat faces rearward.
Figure 2:
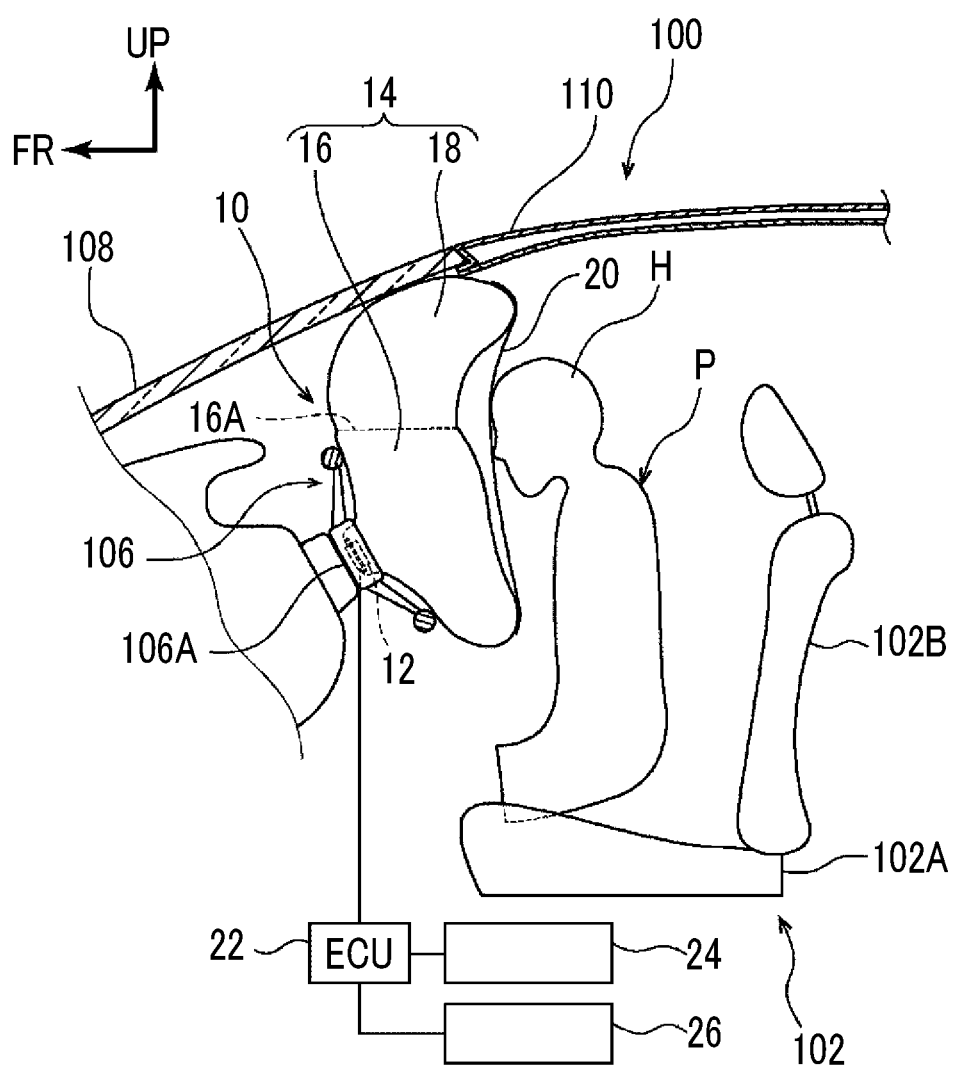
FIG. 2 is a side view schematically illustrating how protection is performed by the front seat airbag device according to the first embodiment, which is a side view in a case where the driver's seat faces forward.

As illustrated in FIGS. 1 and 2, the front seat airbag device 10 (hereinafter, simply referred to as an "airbag device 10") according to the first embodiment is disposed in front of a driver's seat 102 as a front seat. The driver's seat 102 is disposed at a position that is offset to the left side or the right side with respect to the width direction middle portion of the vehicle 100 and is configured to include a seat cushion 102A and a seat back 102B.

The driver's seat 102 according to the first embodiment is a rotary seat. Specifically, the seat cushion 102A of the driver's seat 102 is attached rotatable with respect to the floor and, in the first embodiment, is rotatable between two positions. One of the two positions is a forward position at which an occupant P faces the front of the vehicle, and the other position is a rearward position at which the occupant P faces the rear of the vehicle.

A steering wheel 106 is disposed in front of the driver's seat 102 configured as described above. The airbag device 10 is mounted in a center pad portion 106A in the middle portion of the steering wheel 106. The driver's seat 102 is provided with a three-point seat belt device (not illustrated). The occupant P is restrained by the shoulder belt and the lap belt of the seat belt device.

Configuration of Airbag Device

The airbag device 10 is configured to include an inflator 12 and an airbag 14. Before inflation deployment, the airbag 14 is folded and stored in the center pad portion 106A with the inflator 12.

Figure 4:
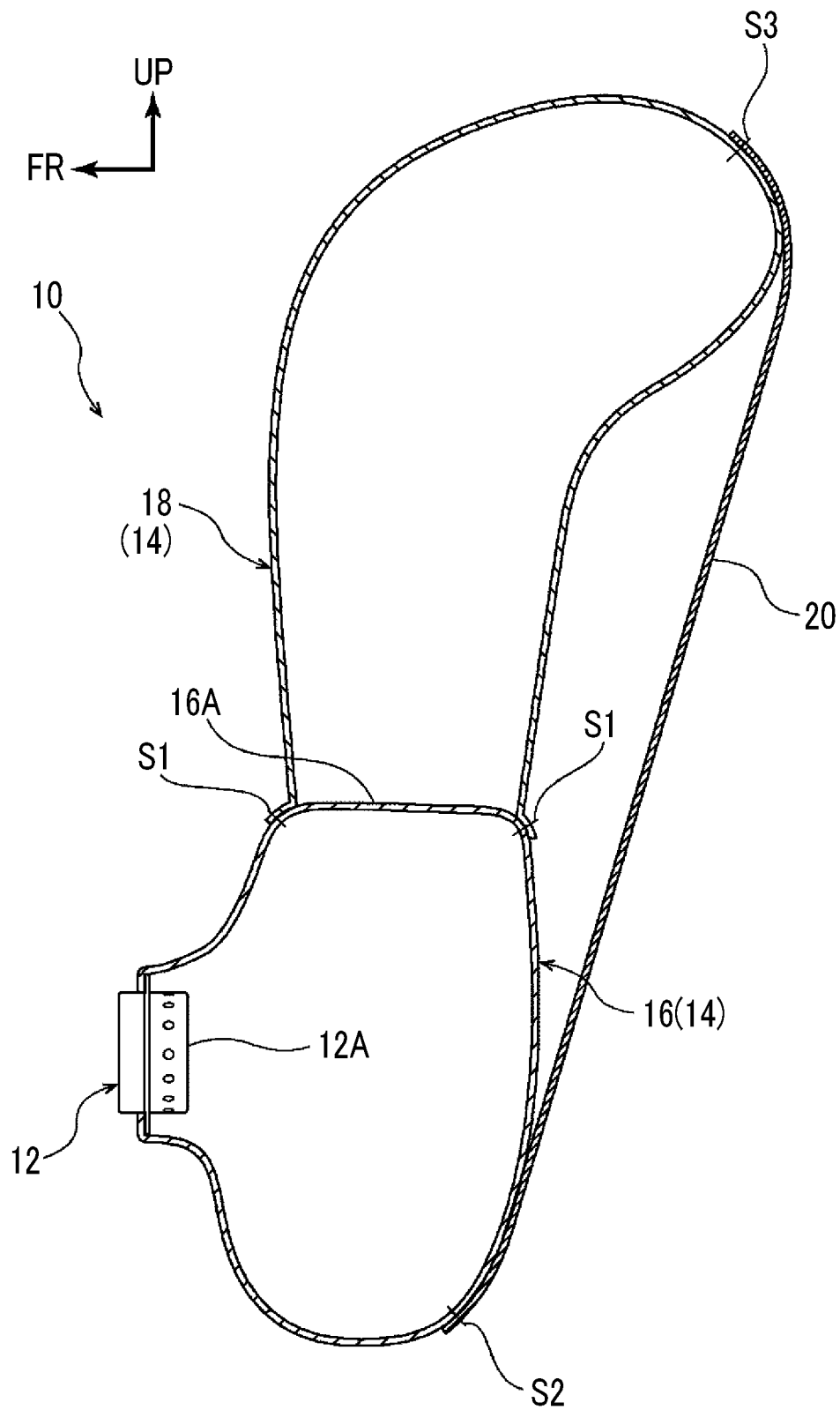
FIG. 4 is a sectional view cut along line IV-IV of FIG. 3.

The inflator 12 is fixed in the center pad portion 106A and has a gas ejection unit 12A inserted into the airbag 14 (refer to FIG. 4). Once the inflator 12 is operated, the inflator 12 generates gas from a plurality of gas ejection holes formed in the gas ejection unit 12A. The gas is supplied into the airbag 14 from the gas ejection unit 12A of the inflator 12, and then the airbag 14 is inflation-deployed toward the driver's seat 102.

The inflator 12 according to the first embodiment is, for example, a dual inflator provided with a plurality of gas generation units and is provided with two, first and second, gas generation units. Each of the two gas generation units has an ignition agent. The first and second gas generation units are configured to be capable of generating gas independently of each other.

Figure 3:
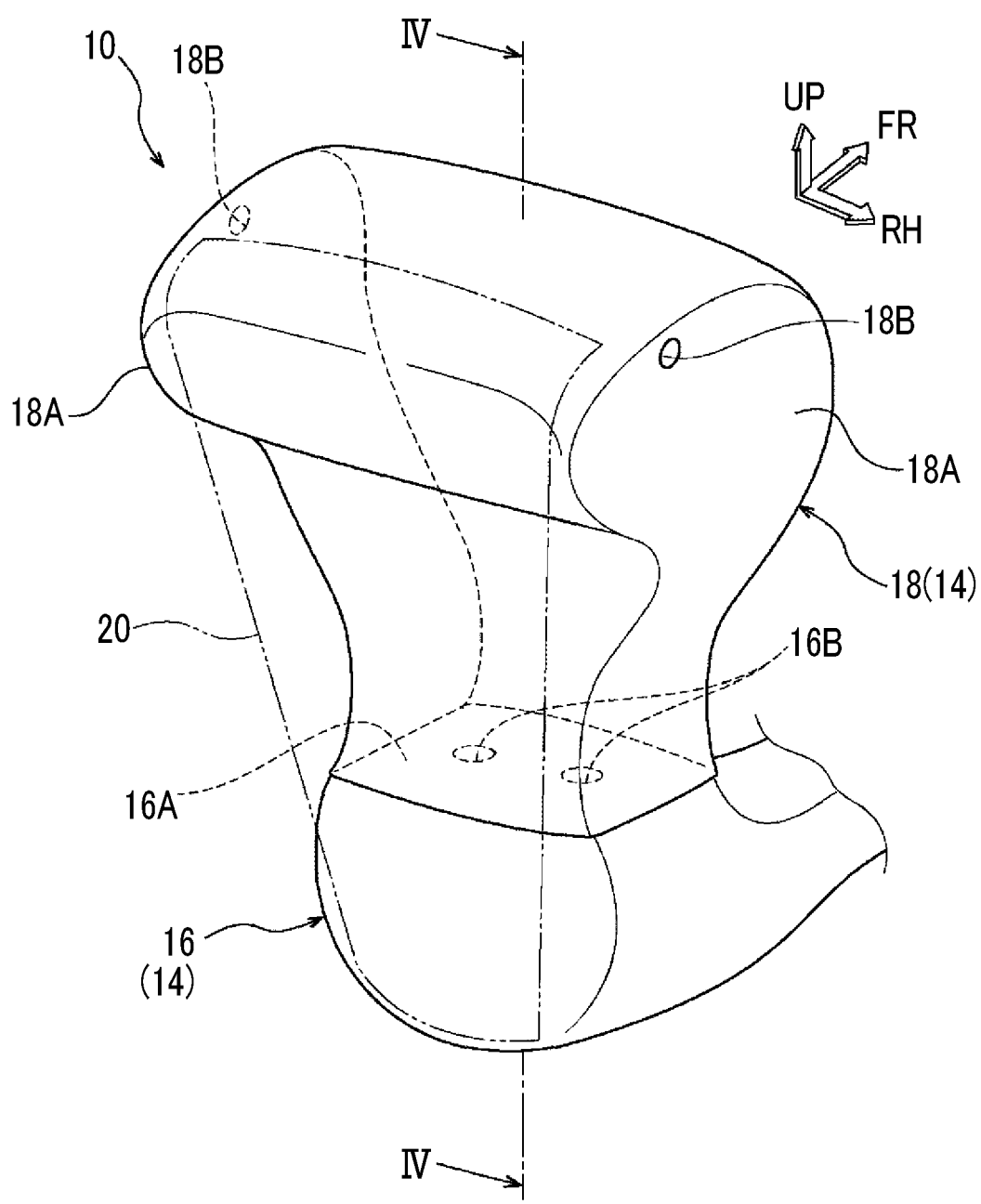
FIG. 3 is a perspective view illustrating the front seat airbag device according to the first embodiment.

As illustrated in FIGS. 3 and 4, the airbag 14 is configured to include a main chamber 16 and a parietal chamber 18. A wide tension cloth 20 (described later) is indicated by an imaginary line in FIG. 3 for convenience of description.

The main chamber 16 is formed in a bag shape by two overlapping base cloths being sewn to each other. The base cloths are formed of, for example, a nylon- or polyester-based cloth material. The main chamber 16 has a substantially circular shape when seen from the driver's seat 102 side. When seen from a vehicle side surface, the main chamber 16 has an appearance formed in a substantially elliptical shape that has the up-down direction as the longitudinal direction thereof.

The main chamber 16 is inflation-deployed at a position facing the upper portion of the seat back 102B of the driver's seat 102 (refer to FIGS. 1 and 2). The inflator 12 is connected to the main chamber 16. In other words, the gas ejection unit 12A of the inflator 12 is inserted into the main chamber 16.

The parietal chamber 18 is disposed on the upper end portion of the main chamber 16 in the inflation deployment state thereof and is configured to be inflation-deployed upward and rearward from the upper end portion of the main chamber 16. As illustrated in FIGS. 1 and 2, in the first embodiment, the parietal chamber 18 is configured to abut against windshield glass 108 and a front header 110 after upward inflation deployment from the main chamber 16. Accordingly, the parietal chamber 18 is inflation-deployed upward and rearward along the windshield glass 108 and the front header 110.

The parietal chamber 18 is formed by two overlapping base cloths being sewn to each other. The base cloths are formed of, for example, a nylon- or polyester-based cloth material. The sewing is performed with the lower portion of the parietal chamber 18 overlapping the upper portion of the main chamber 16 (sewing portion 51). When seen from a vehicle side surface, the parietal chamber 18 in the inflation deployment state has an appearance curved upward to the rear of the vehicle.

Figure 6A:
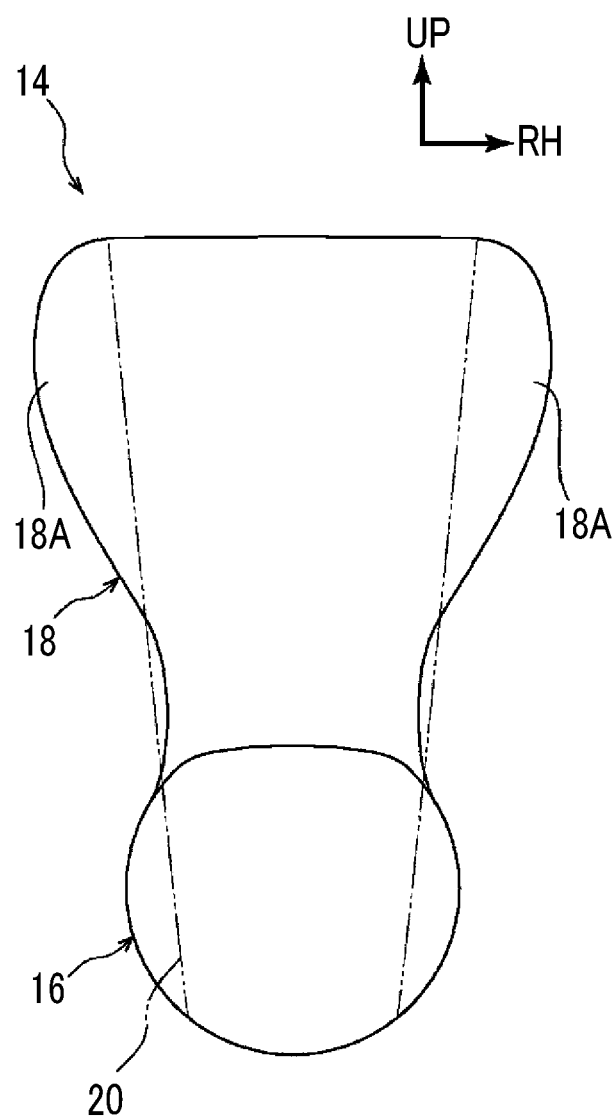
FIG. 6A is a schematic diagram for showing a method for folding an airbag constituting the front seat airbag device according to the first embodiment, which shows a pre-folding state.

As illustrated in FIGS. 3 and 6A, the parietal chamber 18 is formed wider than the main chamber 16. Specifically, both vehicle width direction end portions of the upper portion of the parietal chamber 18 have expansion portions 18A expanded more than the main chamber 16 in the vehicle width direction. Accordingly, when seen from the front (vehicle rear side in the inflation deployment state), the parietal chamber 18 gradually becomes wider toward the top of the vehicle.

The main chamber 16 and the parietal chamber 18 are partitioned from each other by a partition portion 16A. In the first embodiment, the upper portion of the bag-shaped main chamber 16 constitutes the partition portion 16A. In other words, the upper portion of the main chamber 16 functions as the partition portion 16A.

As illustrated in FIG. 3, two communication holes 16B are formed in the partition portion 16A and the internal space of the main chamber 16 and the internal space of the parietal chamber 18 communicate with each other via the communication holes 16B. In the first embodiment, each of the communication holes 16B is formed such that, for example, the communication holes 16B are bilaterally symmetrical with respect to the vehicle width direction middle portion of the main chamber 16 (airbag 14). Each of the communication holes 16B has a substantially circular shape, and the communication holes 16B have the same size.

Vent holes 18B similar to the communication holes 16B are formed in the upper portion of the parietal chamber 18. The vent holes 18B allow the inside and the outside of the parietal chamber 18 to communicate with each other. For example, in the first embodiment, the vent holes 18B that have a substantially circular shape are formed in both right and left side portions of the parietal chamber 18.

The main chamber 16 and the parietal chamber 18 are connected to each other by the wide tension cloth 20 as a tension member. When seen from the front, the wide tension cloth 20 is formed in a substantially trapezoidal shape, as illustrated in FIG. 6A, such that the upper side thereof (vehicle upper side at a time of inflation deployment) is longer than the lower side thereof. The wide tension cloth 20 is disposed such that the vehicle front-rear direction is the thickness direction thereof. The wide tension cloth 20 is disposed at a position facing the seat back 102B of the driver's seat 102 in the inflation deployment state of the airbag 14 and is formed wider than a head H of the occupant P.

The lower end portion of the wide tension cloth 20 overlaps the lower portion of the main chamber 16 and is sewn in a sewing portion S2. The upper end portion of the wide tension cloth 20 overlaps the upper portion of the parietal chamber 18 and is sewn in a sewing portion S3.

The length of the wide tension cloth 20 in the up-down direction is set to a length at which tension acts in the inflation deployment state of the airbag 14. Specifically, in a flat state prior to inflation deployment, the length of the wide tension cloth 20 is set to a length shorter than the length between the sewing portion S2 on the lower side and the sewing portion S3 on the upper side. Accordingly, when the airbag 14 is inflation-deployed, the upper portion of the parietal chamber 18 is deformed downward by the tension of the wide tension cloth 20 to approach the main chamber 16.

Method for Controlling Airbag Device

A method for controlling the airbag device 10 according to the first embodiment will be described below. An electronic control unit (ECU) 22 is electrically connected to the inflator 12 as illustrated in FIGS. 1 and 2, and the operation of the inflator 12 is controlled by the ECU 22.

The ECU 22 is electrically connected to a collision prediction sensor 24 predicting collisions of a pre-crash sensor, an in-vehicle camera, and so on. The ECU 22 is electrically connected to a collision sensor 26 detecting a collision. When a frontal collision of the vehicle is detected or predicted, the ECU 22 operates the inflator 12 based on a signal from at least one of the collision prediction sensor 24 and the collision sensor 26.

The driver's seat 102 or the floor is provided with a seat sensor (not illustrated) detecting the direction of the driver's seat 102. The seat sensor is electrically connected to the ECU 22. The ECU 22 decides on the amount of gas supply from the inflator 12 to the airbag 14 in accordance with output from the seat sensor.

Figure 5:
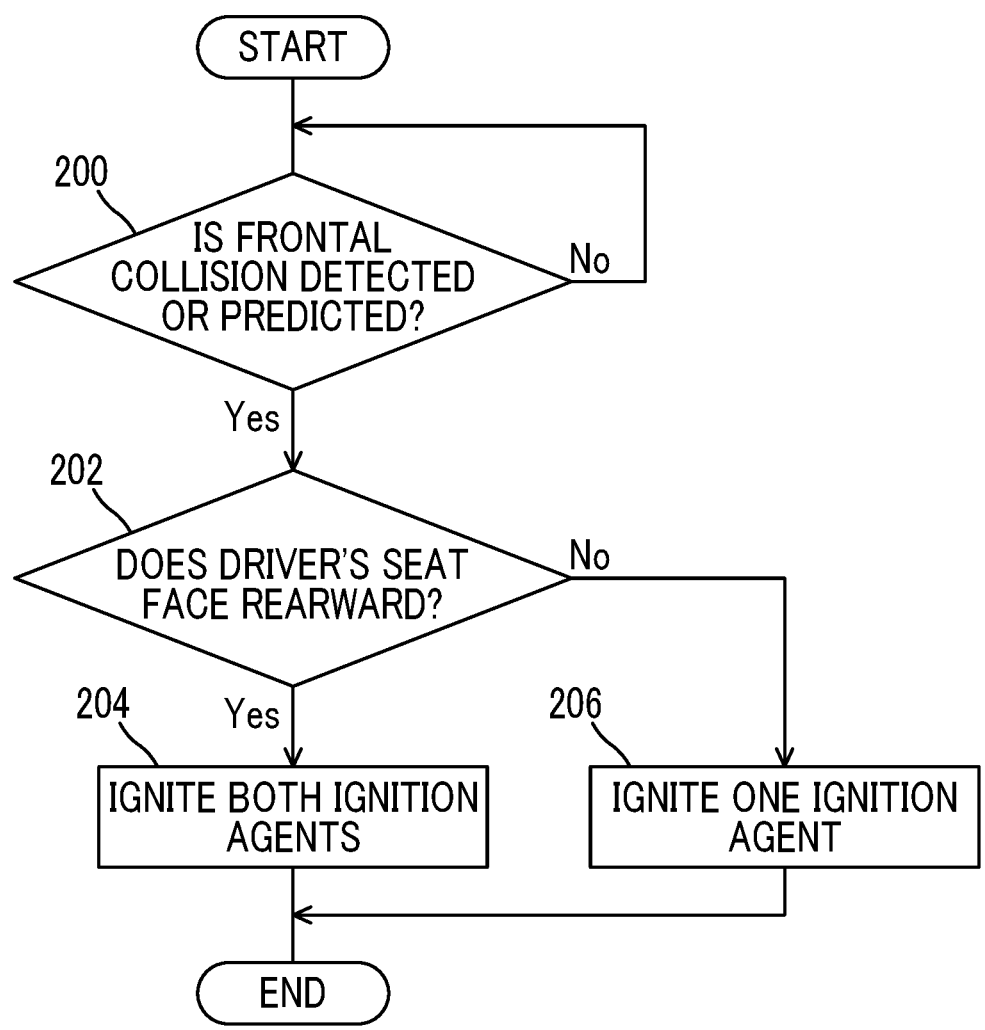
FIG. 5 is a flowchart showing a method for controlling the front seat airbag device according to the first embodiment.

The procedure by which the ECU 22 decides on the amount of gas supply from the inflator 12 to the airbag 14 will be described based on the flowchart that is illustrated in FIG. 5. In Step 200, the ECU 22 determines whether or not a frontal collision has been detected or predicted. In other words, the ECU 22 determines whether or not a signal has been input to the ECU 22 from at least one of the collision prediction sensor 24 and the collision sensor 26.

In a case where a signal has been input to the ECU 22 neither from the collision prediction sensor 24 nor from the collision sensor 26, the ECU 22 stands by until a signal is input (returns to Step 200). The ECU 22 proceeds to Step 202 in a case where a signal has been input to the ECU 22 from at least one of the collision prediction sensor 24 and the collision sensor 26.

In Step 202, the ECU 22 determines whether or not the driver's seat 102 faces rearward. The direction of the driver's seat 102 described above is determined in accordance with output from the seat sensor described above. The ECU 22 proceeds to Step 204 in a case where the driver's seat 102 faces rearward. The ECU 22 proceeds to Step 206 in a case where the driver's seat 102 faces forward.

In Step 204, the two ignition agents in the inflator 12 are ignited and gas is generated from the two, first and second, gas generation units. As a result, the internal pressure of the main chamber 16 exceeds that in a case where gas is generated from one gas generation unit.

In Step 206, merely one of the ignition agents in the inflator 12 is ignited and gas is generated from merely one of the first gas generation unit and the second gas generation unit. In this manner, the amount of gas supply is controlled such that the internal pressure of the main chamber 16 is higher in a case where the driver's seat 102 faces rearward than in a case where the driver's seat 102 faces forward. In the first embodiment, the internal pressure of the main chamber 16 in a case where merely one of the ignition agents is ignited is set to the pressure that is optimal for restraining the head H of a forward-seated occupant during a frontal collision of the vehicle.

Method for Folding Airbag According to First Embodiment

A method for folding the airbag 14 constituting the airbag device 10 according to the first embodiment will be described with reference to FIGS. 6A, 6B, 7A, and 7B.

As illustrated in FIG. 6A, the main chamber 16 and the parietal chamber 18 are spread flat before the airbag 14 is folded. The wide tension cloth 20 is already sewn to the main chamber 16 and the parietal chamber 18 and is stretched.

Figure 6B:
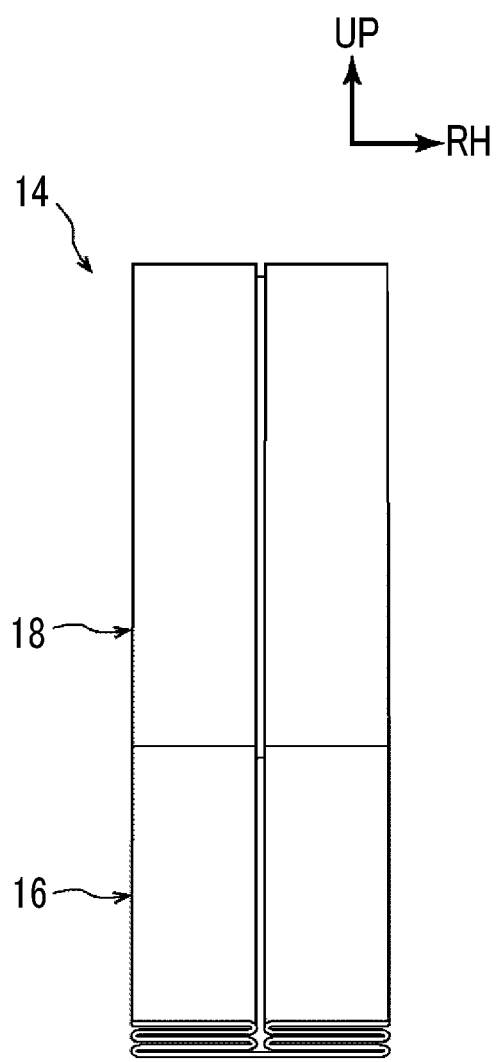
FIG. 6B is a schematic diagram for showing the method for folding the airbag constituting the front seat airbag device according to the first embodiment, which shows a state where a first step has been completed.

In a first step following the pre-folding state, each of the right and the left of the main chamber 16 and the parietal chamber 18 is folded in a bellows shape. Then, the state that is illustrated in FIG. 6B occurs. Specifically, each of the right and the left is folded in a bellows shape and to the vehicle rear side (near side of the page) by the up-down direction being used as a polygonal line. In this case, the wide tension cloth 20 is folded inside. In the first embodiment, the right and left end portions of the part that is positioned at the top in the folded state are folded to face outward so that deployment of the part folded in the first step is accelerated.

In a second step following the state of FIG. 6B where the folding has been carried out in the first step, each of the top and the bottom of the main chamber 16 is folded in a bellows shape to the vehicle rear side (near side of the page) by the right-left direction being used as a polygonal line.

Figure 7A:
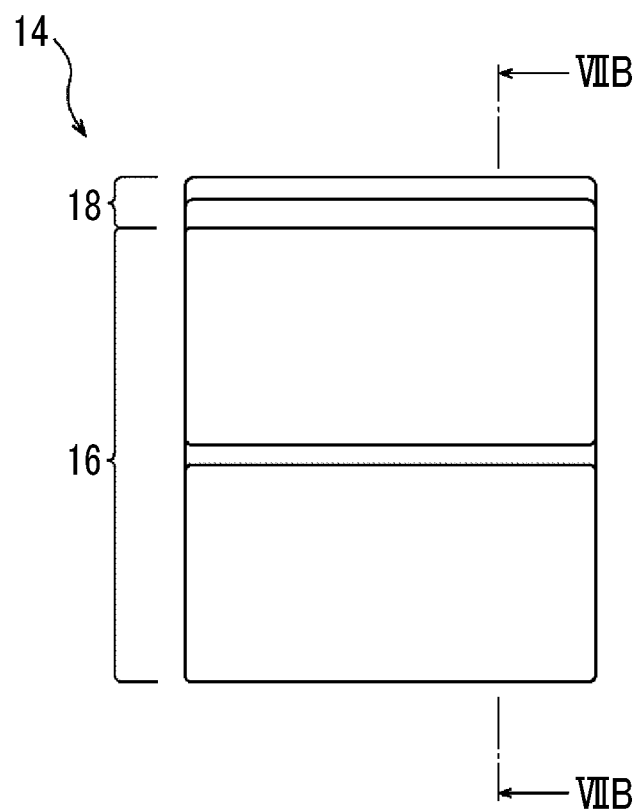
FIG. 7A is a schematic diagram for showing the method for folding the airbag constituting the front seat airbag device according to the first embodiment, which shows a state where a third step has been completed.
Figure 7B:
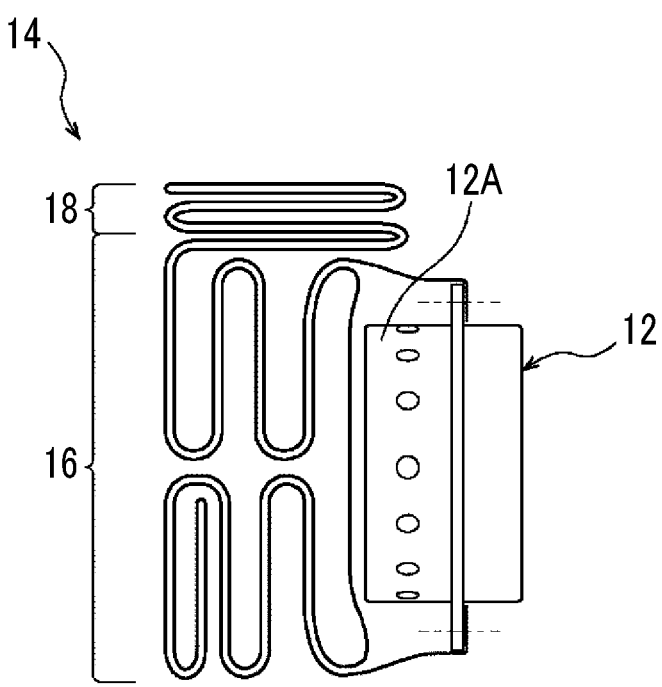
FIG. 7B is a schematic diagram for showing the method for folding the airbag constituting the front seat airbag device according to the first embodiment, which is cut along line VIIB-VIIB of FIG. 7A.

In a third step following the state where the folding has been carried out in the second step, the parietal chamber 18 is folded in a bellows shape, by the right-left direction being used as a polygonal line, and disposed on the main chamber 16. As a result, the state that is illustrated in FIGS. 7A and 7B occurs. Although the parietal chamber 18 is folded in a bellows shape in the first embodiment, the parietal chamber 18 may also be folded in a roll shape from the upper end toward the lower end and to the front seat side in the inflation deployment state.

By the airbag 14 being folded as described above, the main chamber 16 is inflated and deployed from the center pad portion 106A to the driver's seat 102 side once gas is supplied from the inflator 12 to the airbag 14. In this case, the deployment of the main chamber 16 is not hindered by the parietal chamber 18 and the main chamber 16 is smoothly deployed since the parietal chamber 18 is disposed on the main chamber 16.

The parietal chamber 18 is inflation-deployed upward and rearward from the main chamber 16 by gas being supplied from the main chamber 16 to the parietal chamber 18 via the communication holes 16B (refer to FIG. 3).

Action and Effect

The action of the first embodiment will be described below.

As illustrated in FIG. 1, in the airbag device 10 according to the first embodiment, the parietal chamber 18 is inflation-deployed upward and rearward from the upper end portion of the main chamber 16 when a frontal collision is detected or predicted. In a state where the driver's seat 102 faces rearward at that time, an occupant may be inertially moved diagonally upward (in the arrow A direction) along the seat back 102B by the inertial force that is directed toward the vehicle front side at the time of the frontal collision of the vehicle. Even in this case, the occupant's head H (parietal part) can be restrained by the parietal chamber 18. Falling of the rearward driver's seat 102 to the front of the vehicle (in the arrow B direction) can be effectively suppressed by inflation deployment of the main chamber 16.

In the first embodiment, the main chamber 16 and the parietal chamber 18 are connected to each other by the wide tension cloth 20. As a result, in the inflation deployment state of the airbag 14, the upper portion of the parietal chamber 18 is pulled to the main chamber 16 side (downward) by the wide tension cloth 20. In a state where the driver's seat 102 faces rearward, in particular, the wide tension cloth 20 is folded and bent by the seat back 102B, and thus the parietal chamber 18 is pulled further downward. As a result, the parietal part of the occupant P is covered from the vehicle upper side by the parietal chamber 18 and a restraining force can be improved with respect to the head H (parietal part) of the occupant P inertially moved upward.

Figure 8A:
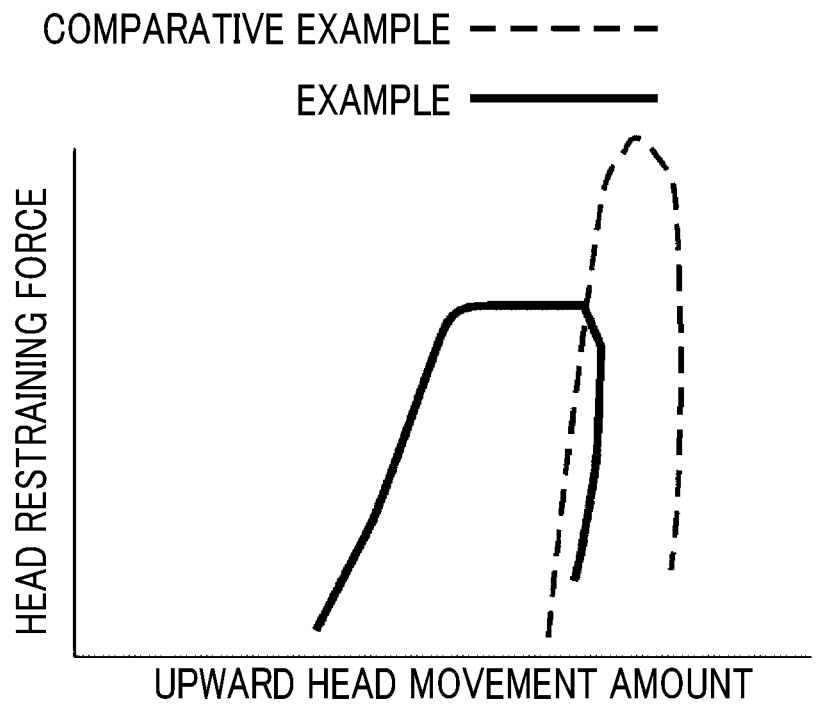
FIG. 8A is a graph showing the relationship between the upward head movement amount and the head restraining force at the time of a frontal collision of a vehicle, which is a graph in a state where the driver's seat faces rearward.
Figure 8B:
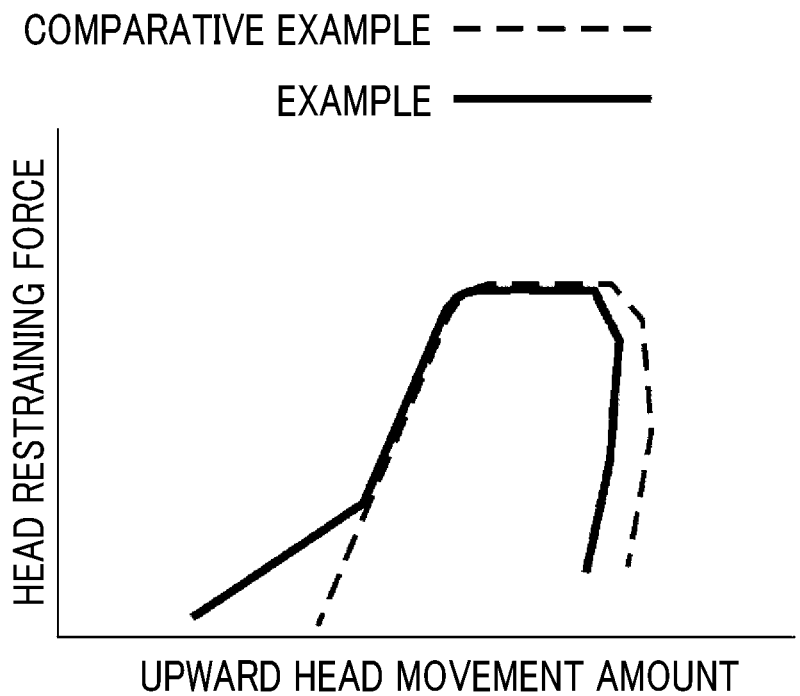
FIG. 8B is a graph showing the relationship between the upward head movement amount and the head restraining force at the time of a frontal collision of a vehicle, which is a graph in a state where the driver's seat faces forward.

The effect of the parietal chamber 18 described above will be described with reference to FIGS. 8A and 8B. FIGS. 8A and 8B are graphs showing the upward head movement amount-head restraining force relationship during a frontal collision of the vehicle. The relationships according to an example and a comparative example in a state where the driver's seat 102 faces rearward are illustrated in FIG. 8A. The example is a vehicle in which the airbag device 10 according to the first embodiment is mounted. The comparative example is a vehicle in which a general airbag for a driver's seat that is not provided with the parietal chamber 18 and the wide tension cloth 20 is mounted.

As is apparent from FIG. 8A, the upward head movement amount is larger in the comparative example indicated by the dashed line than in the example indicated by the solid line. This is because the comparative example is not provided with the parietal chamber 18 and thus, in the comparative example, the head H of the occupant P inertially moved diagonally upward along the seat back 102B during a frontal collision of the vehicle moves upward until coming into contact with the windshield glass 108 or the front header 110.

Unlike in the comparative example described above, in the example, the head H of the occupant P can be restrained early by the parietal chamber 18, and thus it is understood that restraint initiation is earlier than in the comparative example. It is understood that the head restraining force is gradually raised by the head H being restrained by the parietal chamber 18 and the maximum value of the head restraining force is smaller than in the comparative example as a result. It is understood that the occupant restraining performance in a case where the driver's seat 102 faces rearward is maintained by the parietal chamber 18 as described above.

As illustrated in FIG. 2, in a state where the driver's seat 102 faces forward, the head H of the occupant P inertially moved to the front of the vehicle can be restrained by the main chamber 16. In the first embodiment, in particular, the wide tension cloth 20 faces the driver's seat 102 during inflation deployment of the airbag 14, and thus the occupant P is restrained by the wide tension cloth 20 before the occupant P is restrained by the main chamber 16 when a frontal collision of the vehicle occurs in a state where the driver's seat 102 faces forward. In other words, the head H of the occupant P in a state where the driver's seat 102 faces forward can be restrained early.

By the head H of the occupant P being restrained by the wide tension cloth 20, the wide tension cloth 20 is pulled and the parietal chamber 18 is deformed to the main chamber 16 side (downward). As a result, the head H of the occupant P is wrapped in the main chamber 16 and the parietal chamber 18 and the restraining performance for the head H can be further improved.

The relationships according to the example and the comparative example in a state where the driver's seat 102 faces forward are illustrated in FIG. 8B. As is apparent from FIG. 8B, restraint initiation is earlier in the example indicated by the solid line than in the comparative example indicated by the dashed line. This is because the head H of the occupant P is restrained by the wide tension cloth 20 before the occupant P is restrained by the main chamber 16 as described above. As described above, the head restraining performance for the occupant P at the time of a frontal collision of the vehicle can be maintained regardless of whether the driver's seat 102 faces forward or rearward.

In the structure of the first embodiment, the inflator 12 is connected to the main chamber 16 and gas is supplied from the inflator 12 to the main chamber 16 at first. As a result, the main chamber 16 is inflation-deployed early, and thus the initial restraining force for the head H of the occupant P in a case where the driver's seat 102 faces forward can be improved.

As illustrated in FIG. 1, the seat back 102B is supported by the main chamber 16 in a case where the driver's seat 102 faces rearward. Here, falling of the seat back 102B can be effectively suppressed by the main chamber 16 being inflation-deployed early as in the first embodiment.

As illustrated in FIG. 3, in the structure of the first embodiment, the parietal chamber 18 and the main chamber 16 are partitioned from each other by the partition portion 16A and communicate with each other via the communication holes 16B. As a result, the parietal chamber 18 is inflation-deployed after the main chamber 16 is inflation-deployed, and thus the internal pressure of the parietal chamber 18 can be maintained until a timing at which the occupant P is inertially moved diagonally upward along the seat back 102B.

Each of the communication holes 16B is formed such that the communication holes 16B are bilaterally symmetrical with respect to the vehicle width direction middle portion of the main chamber 16. Accordingly, gas flows equally on the right and left from the main chamber 16 to the parietal chamber 18. As a result, the deployment behavior of the parietal chamber 18 can be stabilized and the parietal chamber 18 can be smoothly inflation-deployed.

As illustrated in FIG. 6A, in the first embodiment, both vehicle width direction end portions of the upper portion of the parietal chamber 18 have the expansion portions 18A and the expansion portions 18A expand more than the main chamber 16 to the vehicle width direction outer sides. As a result, the range in which the parietal part of the occupant P is restrained can be widened. Accordingly, the head H of the occupant P can be restrained in a satisfactory manner even in a case where, for example, the parietal part of the occupant P abuts with rightward or leftward shifting from the vehicle width direction middle portion of the parietal chamber 18.

The vent holes 18B are formed in the parietal chamber 18 according to the first embodiment, and the vent holes 18B allow the inside and the outside of the parietal chamber 18 to communicate with each other. As a result, the internal pressure of the parietal chamber 18 can be appropriately maintained.

As in the flowchart illustrated in FIG. 5, in the first embodiment, the amount of gas supply to the main chamber 16 is controlled such that the internal pressure of the main chamber 16 is higher in a case where the driver's seat 102 faces rearward than in a case where the driver's seat 102 faces forward. As a result, falling of the seat back 102B to the vehicle front side during a frontal collision of the vehicle can be effectively suppressed by the high-pressure main chamber 16. In a case where the driver's seat 102 faces forward, the internal pressure of the main chamber 16 is not higher than needed and the head H can be restrained at a normal-range internal pressure at which the head H of the occupant P is restrained.

In the first embodiment, the airbag 14 is folded as illustrated in FIGS. 7A and 7B, and thus the parietal chamber 18 disposed on the main chamber 16 is deployed in advance. As a result, inflation deployment of the main chamber 16 is completed without being hindered by the parietal chamber 18. As a result, the deployment behaviors of the main chamber 16 and the parietal chamber 18 can be stabilized.

In the first embodiment, the wide tension cloth 20 facing the driver's seat 102 in the inflation deployment state is used as a tension member connecting the main chamber 16 and the parietal chamber 18. For example, a narrow tension cloth 52 may be used as in the modification example that is illustrated in FIGS. 9 and 10.

Figure 9:
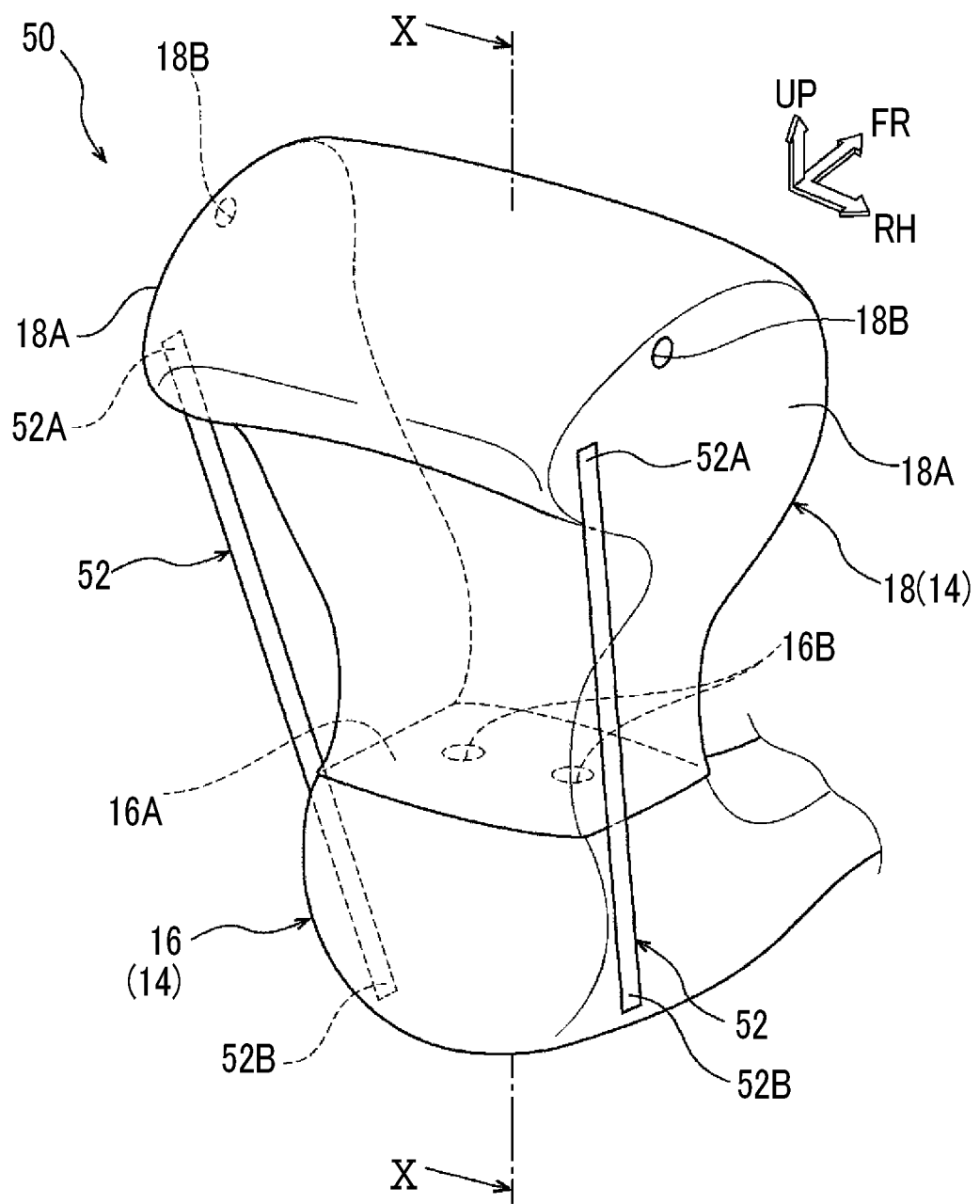
FIG. 9 is a perspective view illustrating a modification example of the front seat airbag device according to the first embodiment.
Figure 10:
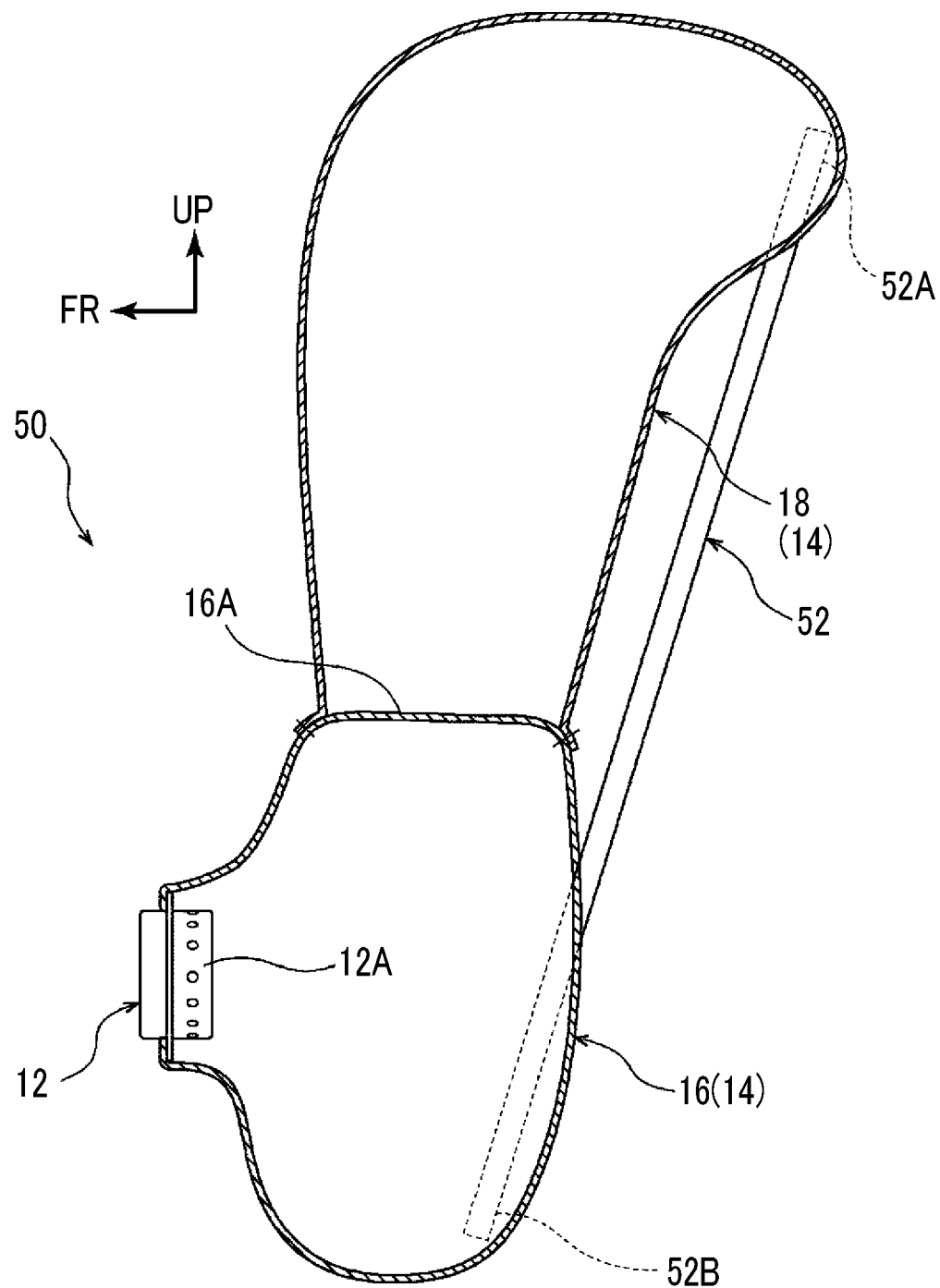
FIG. 10 is a sectional view cut along line X-X of FIG. 9.

As illustrated in FIGS. 9 and 10, the airbag 14 that constitutes a front seat airbag device 50 (hereinafter, simply referred to as an "airbag device 50") according to the modification example of the first embodiment is configured to include the main chamber 16 and the parietal chamber 18. The main chamber 16 and the parietal chamber 18 are similar in structure to the main chamber 16 and the parietal chamber 18 illustrated in FIG. 3, and thus detailed description thereof will be omitted.

The main chamber 16 and the parietal chamber 18 are connected by a pair of right and left narrow tension cloths 52 as tension members. Each of the narrow tension cloths 52 is formed in an elongated shape and narrower in width than the wide tension cloth 20. The vehicle width direction end portions of the main chamber 16 and the parietal chamber 18 in the inflation deployment state are connected to each other by the narrow tension cloths 52.

Specifically, an upper end portion 52A of the narrow tension cloth 52 on the vehicle right side is sewn to the vehicle right side end portion of the upper portion of the parietal chamber 18. A lower end portion 52B of the narrow tension cloth 52 is sewn to the vehicle right side end portion of the lower portion of the main chamber 16. As is the case with the narrow tension cloth 52 on the vehicle right side, the narrow tension cloth 52 on the vehicle left side is sewn to each of the vehicle left side end portion of the upper portion of the parietal chamber 18 and the vehicle left side end portion of the lower portion of the main chamber 16.

In the airbag device 50 according to the modification example of the first embodiment, both vehicle width direction end portions of the parietal chamber 18 are pulled to the main chamber 16 side (downward) by the narrow tension cloths 52 in the inflation deployment state of the airbag 14. As a result, the head H of the occupant P can be restrained in a satisfactory manner even in a case where the head H of the occupant P is inertially and diagonally moved during a frontal collision of the vehicle such as a diagonal collision and a small overlap collision. The diagonal collision is, for example, a diagonal collision from the front defined by the National Highway Traffic Safety Administration (NHTSA). Examples of the diagonal collision include a collision that has a vehicle width direction lap amount of approximately 35% at a relative angle with the collision counterpart of 15°. The small overlap collision is, for example, a collision that is defined by the Insurance Institute for Highway Safety (IIHS) and has a vehicle width direction lap amount of 25% or less with respect to the collision counterpart. Examples of the small overlap collision include a collision to a vehicle width direction outer side with respect to a front side member as a vehicle body skeleton.

Second Embodiment

Hereinafter, a front seat airbag device 60 according to a second embodiment will be described with reference to FIGS. 11 and 12. The same reference numerals will be used to refer to configurations similar to those of the first embodiment so that description thereof is appropriately omitted.

Figure 11:
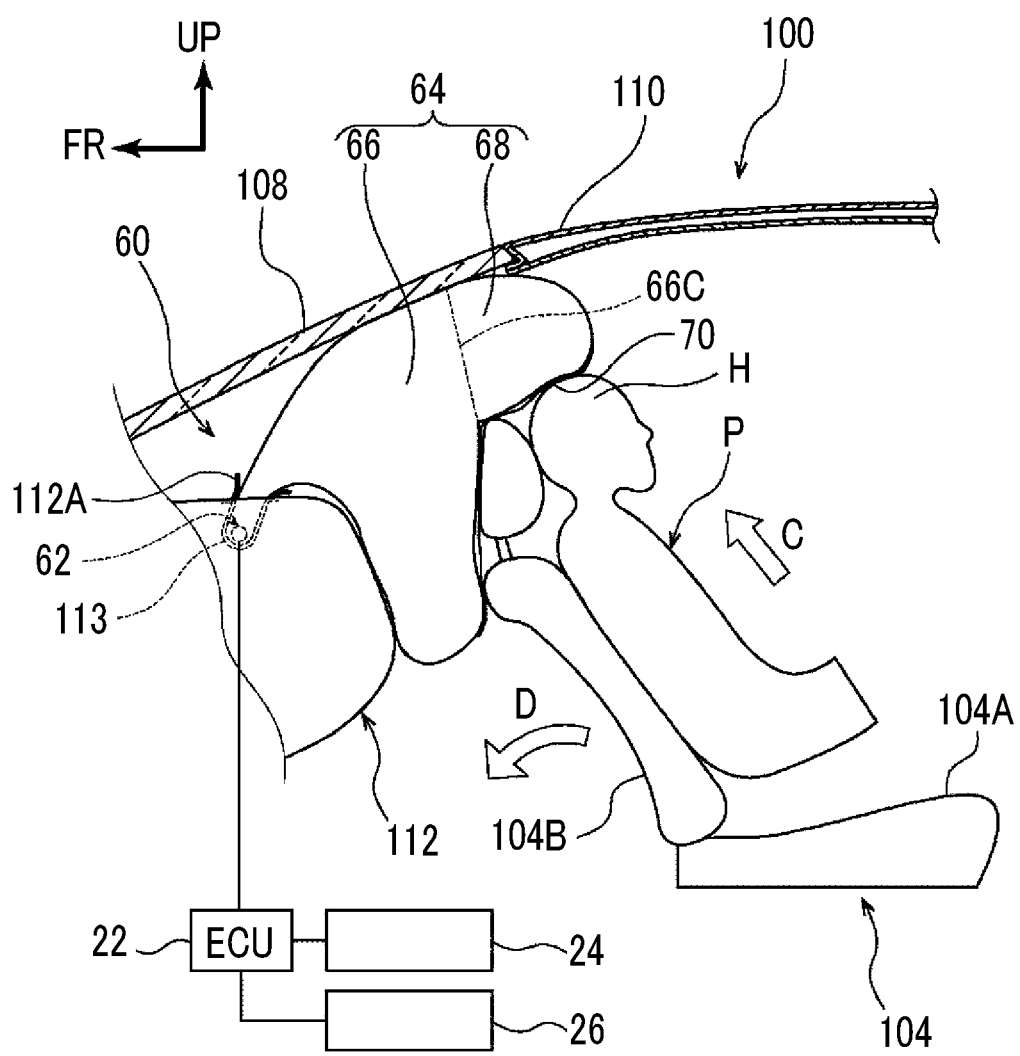
FIG. 11 is a side view schematically illustrating how protection is performed by a front seat airbag device according to a second embodiment, which is a side view in a case where a passenger seat faces rearward.
Figure 12:
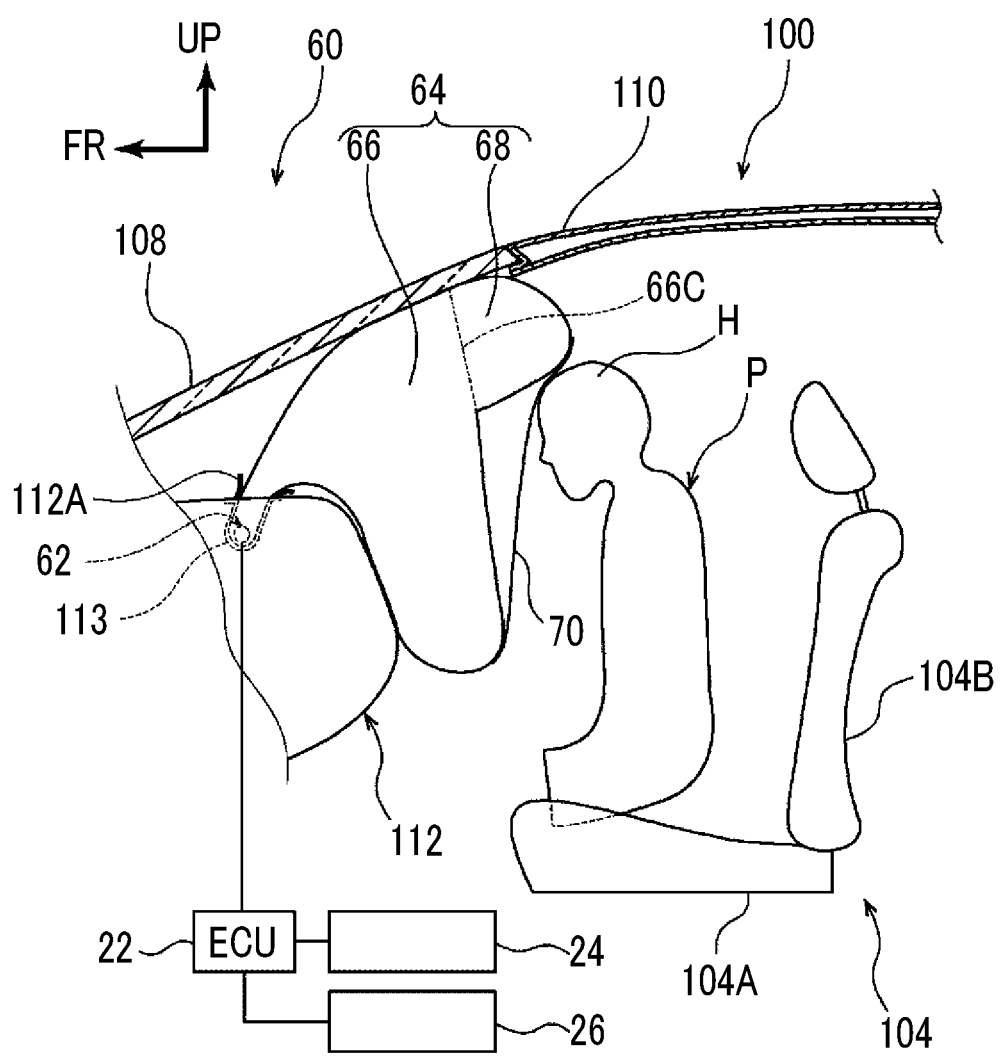
FIG. 12 is a side view schematically illustrating how protection is performed by the front seat airbag device according to the second embodiment, which is a side view in a case where the passenger seat faces forward.

As illustrated in FIGS. 11 and 12, the front seat airbag device 60 (hereinafter, simply referred to as an "airbag device 60") according to the second embodiment is disposed in front of a passenger seat 104 as a front seat. The passenger seat 104 is disposed at a position that is offset to the side opposite to the driver's seat 102 with respect to the width direction middle portion of the vehicle 100 and is configured to include a seat cushion 104A and a seat back 104B.

The passenger seat 104 is a rotary seat as is the case with the driver's seat 102. The passenger seat 104 is rotatable between two positions. One of the two positions is a forward position at which the occupant P faces the front of the vehicle, and the other position is a rearward position at which the occupant P faces the rear of the vehicle. An instrument panel 112 is disposed in front of the passenger seat 104. The airbag device 60 is mounted in the instrument panel 112. The passenger seat 104 is provided with a three-point seat belt device (not illustrated). The occupant P is restrained by the shoulder belt and the lap belt of the seat belt device.

Configuration of Airbag Device

The airbag device 60 is configured to include an inflator 62 and an airbag 64. Before inflation deployment, the airbag 64 is folded and stored in an airbag case 113 inside the instrument panel 112 with the inflator 62.

The inflator 62 is fixed in the airbag case 113. Gas is generated by the inflator 62 being operated. The gas is supplied into the airbag 64 from the inflator 62, and then the airbag 64 is inflated, an airbag door 112A is opened, and the airbag 64 is inflation-deployed toward the passenger seat 104. The inflator 62 according to the second embodiment is a dual inflator as in the first embodiment.

Figure 13:
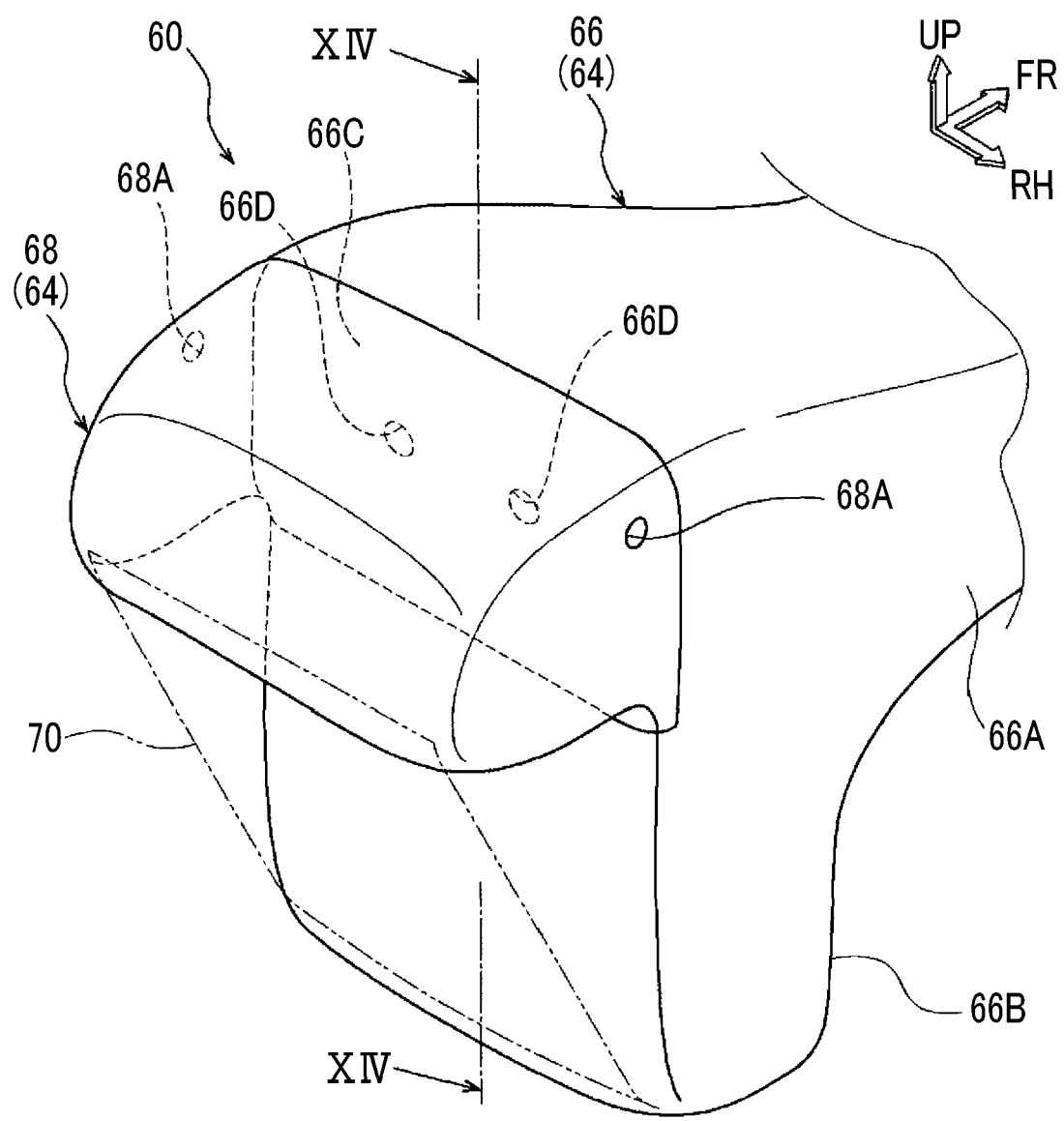
FIG. 13 is a perspective view illustrating the front seat airbag device according to the second embodiment.
Figure 14:
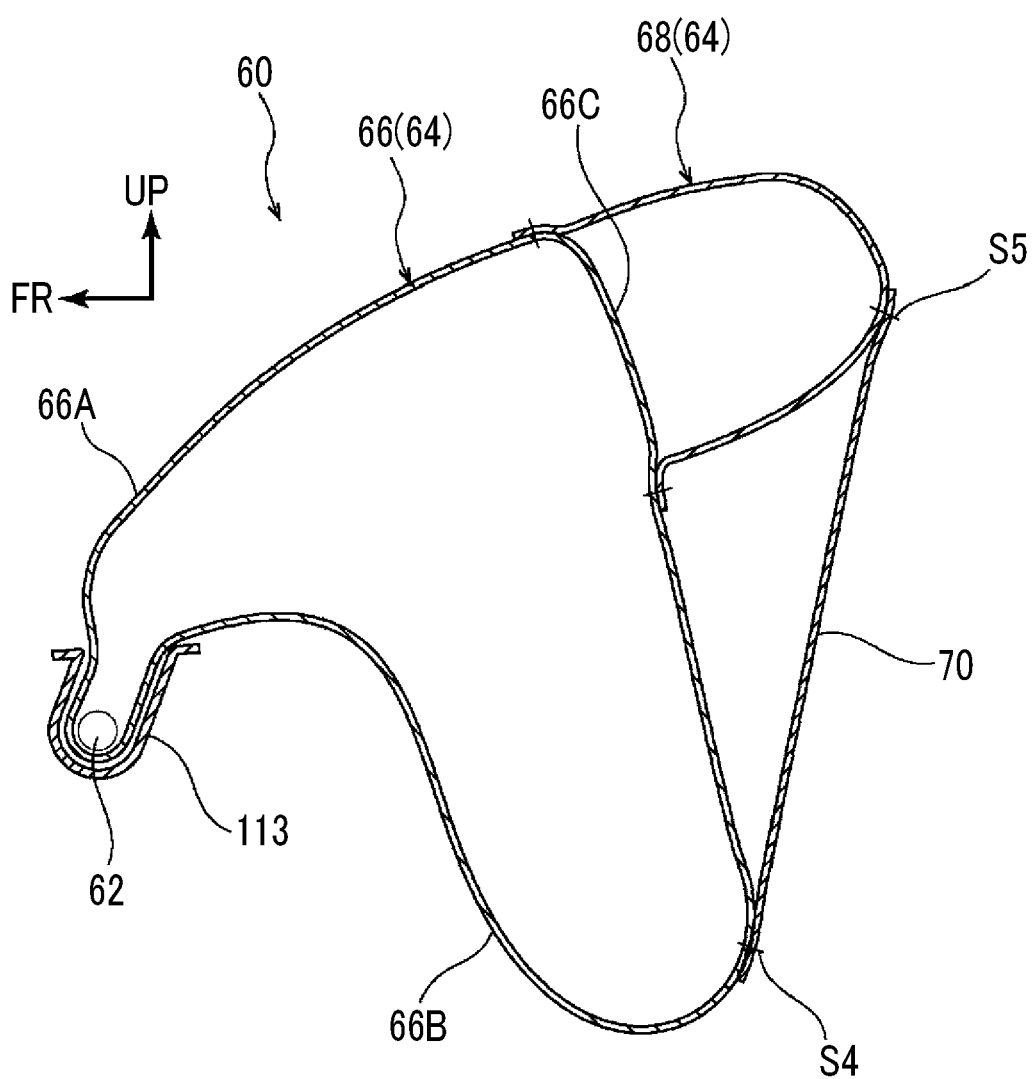
FIG. 14 is a sectional view cut along line XIV-XIV of FIG. 13.

As illustrated in FIGS. 13 and 14, the airbag 64 is configured to include a main chamber 66 and a parietal chamber 68. A wide tension cloth 70 (described later) is indicated by an imaginary line in FIG. 13 for convenience of description.

The main chamber 66 is formed in a bag shape by two overlapping base cloths being sewn to each other. The base cloths are formed of, for example, a nylon- or polyester-based cloth material. The main chamber 66 in the inflation deployment state thereof is shaped to include an introduction portion 66A extending rearward from the upper surface of the instrument panel 112 and a restraining portion 66B extending downward from the rear end of the introduction portion 66A. The restraining portion 66B is inflation-deployed to cover the rear surface of the instrument panel 112. The main chamber 66 is inflation-deployed at a position facing the upper portion of the seat back 104B of the passenger seat 104 (refer to FIGS. 11 and 12).

The parietal chamber 68 is disposed on the rear surface (vehicle rear side surface) of the upper end portion of the main chamber 66 in the inflation deployment state thereof and is configured to be inflation-deployed upward and rearward from the upper end portion of the main chamber 66.

The parietal chamber 68 is formed by two overlapping base cloths being sewn to each other. The base cloths are formed of, for example, a nylon- or polyester-based cloth material. The sewing is performed with an end portion of the parietal chamber 68 overlapping the upper end portion of the main chamber 66.

The main chamber 66 and the parietal chamber 68 are partitioned from each other by a partition portion 66C. In the second embodiment, the upper portion of the main chamber 66 formed in a bag shape constitutes the partition portion 66C. In other words, a part of the main chamber 66 functions as the partition portion 66C.

Two communication holes 66D are formed in the partition portion 66C and the internal space of the main chamber 66 and the internal space of the parietal chamber 68 communicate with each other via the communication holes 66D. In the second embodiment, each of the communication holes 66D is formed such that, for example, the communication holes 66D are bilaterally symmetrical with respect to the vehicle width direction middle portion of the main chamber 66 (airbag 64). The communication holes 66D have the same size.

Vent holes 68A are formed in the upper portion of the parietal chamber 68. The vent holes 68A allow the inside and the outside of the parietal chamber 68 to communicate with each other. For example, in the second embodiment, the vent holes 68A that have the same shape are formed in both right and left side portions of the parietal chamber 68.

The main chamber 66 and the parietal chamber 68 are connected to each other by the wide tension cloth 70 as a tension member. When seen from the front, the wide tension cloth 70 is formed in a rectangular shape, as illustrated in FIGS. 15A and 15B, such that the up-down direction (vehicle up-down direction at a time of inflation deployment) is the longitudinal direction thereof. The wide tension cloth 70 is disposed at a position facing the seat back 104B of the passenger seat 104 in the inflation deployment state of the airbag 64.

As illustrated in FIG. 14, the lower end portion of the wide tension cloth 70 overlaps the lower portion of the main chamber 66 and is sewn in a sewing portion S4 and the upper end portion of the wide tension cloth 70 overlaps the upper portion of the parietal chamber 68 and is sewn in a sewing portion S5. The length of the wide tension cloth 70 in the up-down direction is set to a length at which tension acts in the inflation deployment state of the airbag 64. The length of the wide tension cloth 70 according to the second embodiment is set to a length shorter than the length between the sewing portion S4 on the lower side and the sewing portion S5 on the upper side prior to inflation deployment. Accordingly, when the airbag 64 is inflation-deployed, the parietal chamber 68 is deformed to the main chamber 66 side (downward) by the tension of the wide tension cloth 70.

Method for Folding Airbag According to Second Embodiment

A method for folding the airbag 64 constituting the airbag device 60 according to the second embodiment will be described with reference to FIGS. 15A, 15B, 16A, and 16B. The wide tension cloth 70 is indicated by an imaginary line in FIG. 15A for convenience of description.

As illustrated in FIG. 15A, the main chamber 66 and the parietal chamber 68 are spread flat before the airbag 64 is folded. The wide tension cloth 70 is already sewn to the main chamber 66 and the parietal chamber 68 and is stretched. The dashed line 66E in the drawing indicates a polygonal line at a time when a side portion of the main chamber 66 is folded inside. The dashed line 68B in the drawing indicates a polygonal line at a time when a side portion of the parietal chamber 68 is folded inside. The dashed line 66F in the drawing indicates an opening portion for the inflator 62.

In a first step following the flat state described above, each of the right and the left of the main chamber 66 and the parietal chamber 68 is folded in a bellows shape. Then, the state that is illustrated in FIG. 15B occurs. Specifically, each of the right and the left is folded in a bellows shape by being repeatedly folded to the wide tension cloth 70 side by the up-down direction being used as a polygonal line. In this case, the wide tension cloth 70 is folded inside.

Figure 16A:
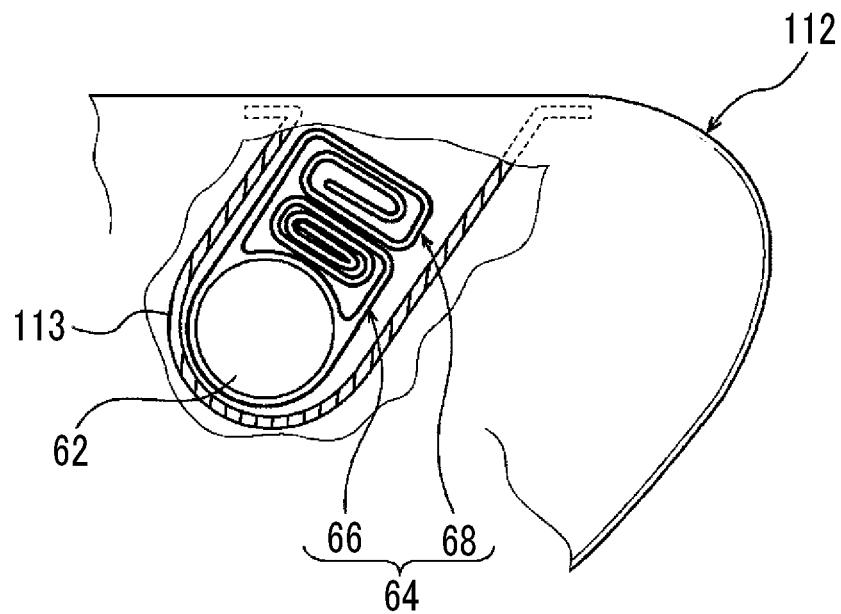
FIG. 16A is a schematic diagram for showing the method for folding the airbag constituting the front seat airbag device according to the second embodiment, which shows a state where a third step has been completed.
Figure 16B:
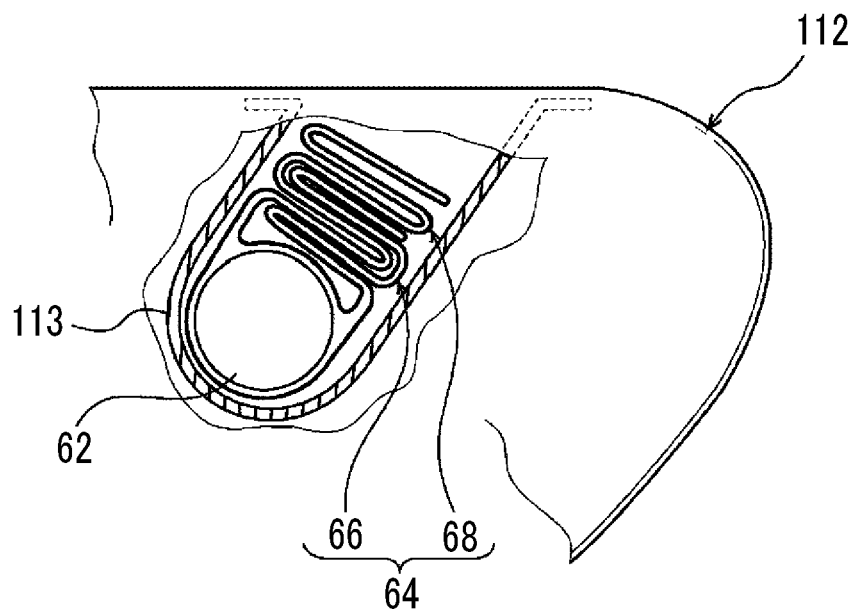
FIG. 16B is a schematic diagram for showing the method for folding the airbag constituting the front seat airbag device according to the second embodiment, which shows a state where folding has been performed by another folding method.

In a second step following the state of FIG. 15B where the folding has been carried out in the first step, the main chamber 66 is folded in a roll shape from the upper end toward the lower end and to the passenger seat 104 side in the inflation deployment state. As illustrated in FIG. 16A, the roll-shaped main chamber 66 is disposed on the inflator 62.

In a third step following the state where the folding has been carried out in the second step, the parietal chamber 68 is folded in a roll shape from the upper end toward the lower end and to the passenger seat 104 side in the inflation deployment state and disposed on the main chamber 66 folded in a roll shape.

By the folding being performed as described above, the main chamber 66 is inflated and deployed from the instrument panel 112 to the passenger seat 104 side first once gas is supplied from the inflator 62 to the airbag 64. In this case, the deployment of the main chamber 66 is not hindered by the parietal chamber 68 and the main chamber 66 is smoothly deployed since the parietal chamber 68 is disposed on the main chamber 66.

The parietal chamber 68 is inflation-deployed upward and rearward from the main chamber 66 by gas being supplied from the main chamber 66 to the parietal chamber 68 via the communication holes 66D (refer to FIG. 13).

Action and Effect

The action of the second embodiment will be described below.

As illustrated in FIG. 11, in the airbag device 60 according to the second embodiment, the parietal chamber 68 is inflation-deployed upward and rearward from the upper end portion of the main chamber 66 when a frontal collision is detected or predicted. In a state where the passenger seat 104 faces rearward at that time, the occupant P may be inertially moved diagonally upward (in the arrow C direction) along the seat back 104B by the inertial force that is directed toward the vehicle front side at the time of the frontal collision of the vehicle. Even in this case, the head H (parietal part in particular) of the occupant P can be restrained by the parietal chamber 68. Falling of the rearward passenger seat 104 to the front of the vehicle (in the arrow D direction) can be effectively suppressed by inflation deployment of the main chamber 66.

As illustrated in FIG. 12, in a case where the passenger seat 104 faces forward, the head H of the occupant P inertially moved to the front of the vehicle can be restrained by the main chamber 66. In the second embodiment, in particular, the wide tension cloth 70 faces the passenger seat 104 during inflation deployment of the airbag 64, and thus the occupant P can be restrained by the wide tension cloth 70 before the occupant P is restrained by the main chamber 66 when a frontal collision of the vehicle occurs in a state where the passenger seat 104 faces forward. In other words, the head H of the occupant P in a state where the passenger seat 104 faces forward can be restrained early.

As illustrated in FIG. 16A, in the second embodiment, the roll-shaped parietal chamber 68 disposed on the main chamber 66 in the third step is deployed in advance. As a result, inflation deployment of the main chamber 66 is completed without being hindered by the parietal chamber. As a result, the deployment behaviors of the main chamber 66 and the parietal chamber 68 can be stabilized. The other effects of the second embodiment are similar to those of the first embodiment.

As illustrated in FIG. 16A, in the second embodiment, the main chamber 66 and the parietal chamber 68 are folded in a roll shape separately from each other. However, other folding methods may be adopted. The methods include the method illustrated in FIG. 16B, by which the main chamber 66 and the parietal chamber 68 are continuously folded in a bellows shape from the state where the folding in the second step has been carried out.

In the second embodiment, the wide tension cloth 70 facing the passenger seat 104 in the inflation deployment state is used as a tension member connecting the main chamber 66 and the parietal chamber 68. However, a narrow tension cloth 82 may be used as in the modification example that is illustrated in FIGS. 17 and 18.

Figure 17:
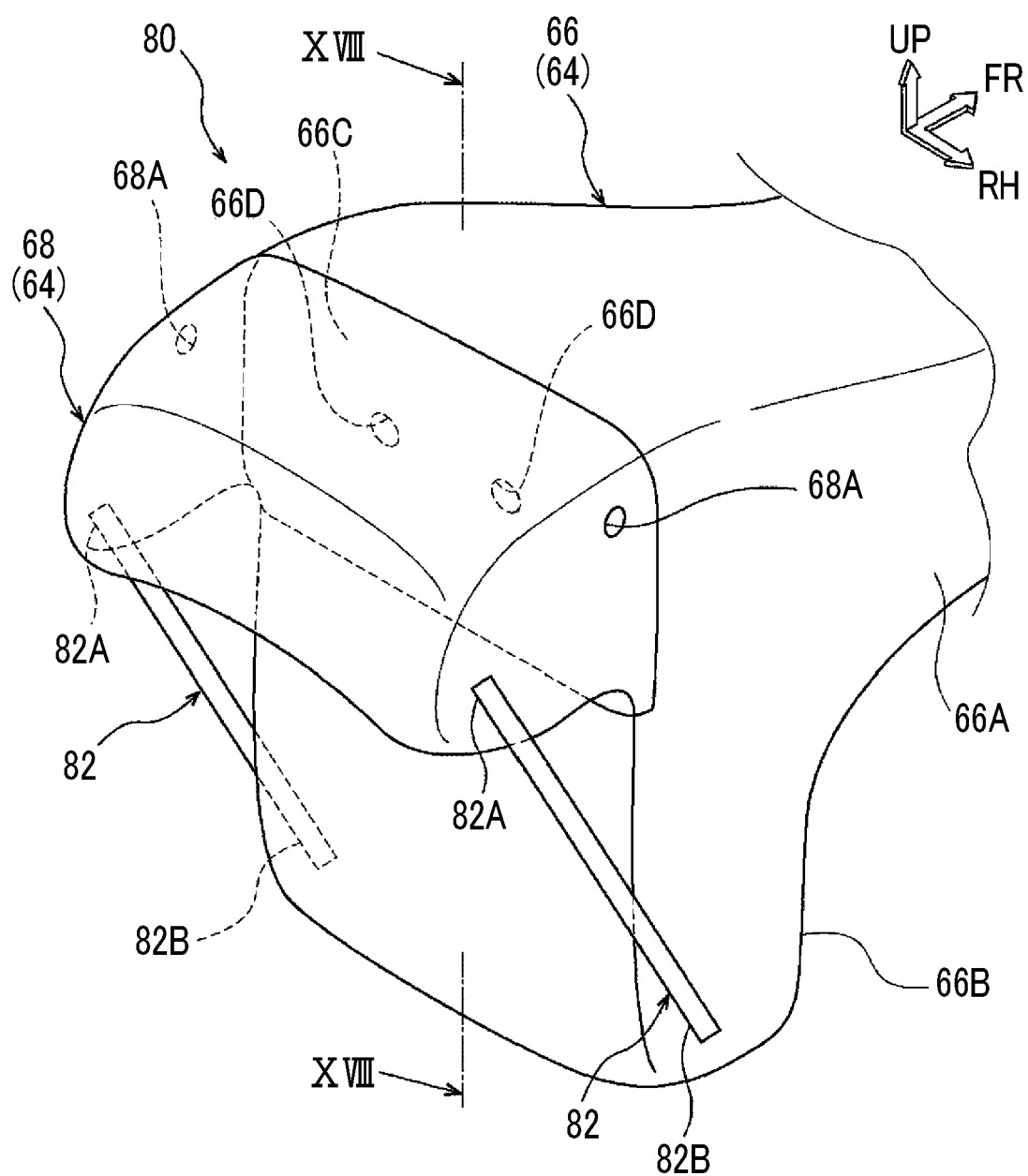
FIG. 17 is a perspective view illustrating a modification example of the front seat airbag device according to the second embodiment.
Figure 18:
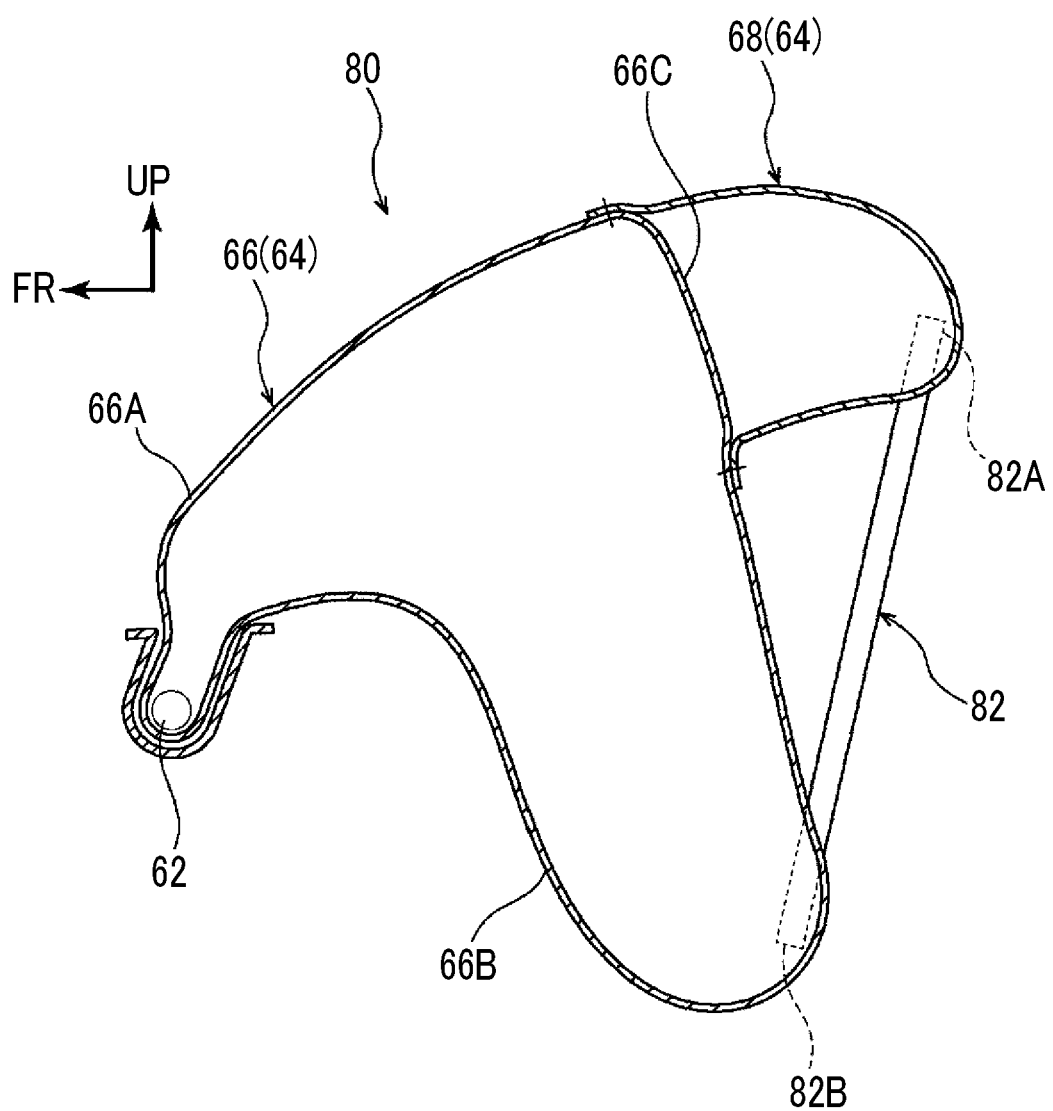
FIG. 18 is a sectional view cut along line XVIII-XVIII of FIG. 17.

As illustrated in FIGS. 17 and 18, the airbag 64 that constitutes a front seat airbag device 80 (hereinafter, simply referred to as an "airbag device 80") according to the modification example of the second embodiment is configured to include the main chamber 66 and the parietal chamber 68. The main chamber 66 and the parietal chamber 68 are similar in structure to the main chamber 66 and the parietal chamber 68 illustrated in FIG. 13, and thus detailed description thereof will be omitted.

The main chamber 66 and the parietal chamber 68 are connected by a pair of right and left narrow tension cloths 82 as tension members. Each of the narrow tension cloths 82 is formed in an elongated shape and narrower in width than the wide tension cloth 70. The vehicle width direction end portions of the main chamber 66 and the parietal chamber 68 in the inflation deployment state are connected to each other by the narrow tension cloths 82. Specifically, an upper end portion 82A of the narrow tension cloth 82 on the vehicle right side overlaps and is sewn to the vehicle right side end portion of the upper portion of the parietal chamber 68. A lower end portion 82B of the narrow tension cloth 82 is sewn to the vehicle right side end portion of the lower portion of the main chamber 66. The narrow tension cloth 82 on the vehicle left side is sewn to each of the vehicle left side end portion of the upper portion of the parietal chamber 68 and the vehicle left side end portion of the lower portion of the main chamber 66.

In the airbag device 80 according to the modification example of the second embodiment, both vehicle width direction end portions of the parietal chamber 68 are pulled to the main chamber 66 side (downward) by the narrow tension cloths 82 in the inflation deployment state of the airbag 64. As a result, the head H of the occupant P can be restrained in a satisfactory manner even in a case where the head H of the occupant P is inertially and diagonally moved during a frontal collision of the vehicle such as a diagonal collision and a small overlap collision.

Although the first and second embodiments have been described above, it is a matter of course that the disclosure is not limited to the above-described configuration and can be implemented in various other forms. For example, a structure without a partition portion may be adopted although the main chamber and the parietal chamber are partitioned from each other by the partition portion in the embodiments described above. The partitioning may be performed by means of a separate member such as a tether.

In the embodiments described above, the bilaterally symmetrical communication holes are formed in the partition portion. The size and position of the communication hole can be appropriately changed in accordance with, for example, specifications needed for the airbag device.

In the embodiments described above, the main chamber and the parietal chamber are connected with a tension member (wide tension cloth, narrow tension cloth). However, a structure without a tension member for connection between the main chamber and the parietal chamber may be adopted. In an alternative structure, the main chamber and the parietal chamber may be connected with a string or the like instead of the wide tension cloth or the narrow tension cloth.

In the embodiments described above, the airbag device is controlled by means of a dual inflator such that the internal pressure of the main chamber is higher in a case where the front seat faces rearward than in a case where the front seat faces forward. However, the internal pressure may be adjusted by another method. For example, the internal pressure may be adjusted by a vent hole being set in the main chamber and the vent hole being opened or closed. In this case, the internal pressure can become relatively high by the vent hole remaining closed with the front seat facing rearward and the internal pressure can become relatively low by the vent hole being opened with the front seat facing forward.

In the second embodiment, the main chamber 66 and the parietal chamber 68 constituting the airbag 64 have the same width dimension. However, in an alternative configuration, for example, the parietal chamber 68 may have an expansion portion to expand more to a vehicle width direction outer side than the main chamber 66.

What is claimed is:

1. A method for controlling a front seat airbag device comprising:
   an inflator configured to generate gas when a frontal collision of a vehicle is detected or predicted; and
   an airbag configured to include
      a main chamber stored in front of a front seat in the vehicle, the main chamber being configured to inflate and deploy to a position facing the front seat by the gas being supplied from the inflator, and
      a parietal chamber configured to inflate and deploy upward and rearward from an upper end portion of the main chamber,
   the method comprising controlling an amount of gas supply from the inflator to the airbag such that an internal pressure of the main chamber is higher in a case where the front seat faces rearward than in a case where the front seat faces forward when the frontal collision of the vehicle is detected or predicted.

2. The method according to claim 1, wherein the control includes:
   generating the gas from a first gas generation unit and a second gas generation unit in the inflator in a case where the front seat faces rearward when the frontal collision of the vehicle is detected or predicted; and
   generating the gas from one of the first gas generation unit and the second gas generation unit in the inflator in a case where the front seat faces forward when the frontal collision of the vehicle is detected or predicted.

3. A method for folding an airbag of a front seat airbag device comprising:
   an inflator configured to generate gas when a frontal collision of a vehicle is detected or predicted; and
   the airbag, the airbag configured to include
      a main chamber stored in front of a front seat in the vehicle, the main chamber being configured to inflate and deploy to a position facing the front seat by the gas being supplied from the inflator, and
      a parietal chamber configured to inflate and deploy upward and rearward from an upper end portion of the main chamber, the method comprising:
   folding each of a right and a left of the main chamber and the parietal chamber in a pre-folding state in a bellows shape, a polygonal line of the bellow shape extending in an up-down direction;
   folding each of a top and a bottom of the main chamber in a bellows shape such that the main chamber faces the front seat in an inflation deployment state of the airbag, a polygonal line of the bellow shape extending in a right-left direction after the folding of each of a right and a left of the main chamber and the parietal chamber; and
   disposing the parietal chamber on the main chamber after the parietal chamber is folded in a bellows shape, a polygonal line of the bellows shape extending in the right-left direction or folded in a roll shape from an upper end toward a lower end such that the parietal chamber faces the front seat in the inflation deployment state of the airbag after the folding of each of a top and a bottom of the main chamber.

4. A method for folding an airbag of a front seat airbag device comprising:
   an inflator configured to generate gas when a frontal collision of a vehicle is detected or predicted; and
   the airbag, the airbag configured to include
      a main chamber stored in front of a front seat in the vehicle, the main chamber being configured to inflate and deploy to a position facing the front seat by the gas being supplied from the inflator, and
      a parietal chamber configured to inflate and deploy upward and rearward from an upper end portion of the main chamber, the method comprising:
   folding each of a right and a left of the main chamber and the parietal chamber in a pre-folding state in a bellows shape, a polygonal line of the bellow shape extending in an up-down direction;
   folding the main chamber in a roll shape from an upper end of the main chamber toward a lower end of the main chamber such that the main chamber faces the front seat in an inflation deployment state of the airbag and disposing the main chamber on the inflator after the folding of each of a right and a left of the main chamber and the parietal chamber; and
   folding the parietal chamber in a roll shape from an upper end of the parietal chamber toward a lower end of the parietal chamber such that the parietal chamber faces the front seat in the inflation deployment state of the airbag and disposing the parietal chamber on the main chamber folded in the roll shape after the folding of the main chamber.

* * * * *